(12) United States Patent
Suzuki et al.

(10) Patent No.: US 11,235,646 B2
(45) Date of Patent: Feb. 1, 2022

(54) VEHICLE-BODY STRUCTURE OF VEHICLE

(71) Applicant: MAZDA MOTOR CORPORATION, Hiroshima (JP)

(72) Inventors: Kaori Suzuki, Aki-gun (JP); Masanori Honda, Hiroshima (JP); Tomohito Okuyama, Kure (JP); Ryuji Nonaka, Aki-gun (JP); Hideaki Fujii, Higashihiroshima (JP); Noboru Shouno, Hiroshima (JP); Daisuke Nakayama, Hiroshima (JP); Isamu Kizaki, Hiroshima (JP); Eri Kaiki, Aki-gun (JP); Yuichi Sugimura, Higashihiroshima (JP); Taei Shibahara, Hiroshima (JP); Orie Tanaka, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/931,329

(22) Filed: Jul. 16, 2020

(65) Prior Publication Data

US 2021/0023921 A1 Jan. 28, 2021

(30) Foreign Application Priority Data

Jul. 23, 2019 (JP) .............................. JP2019-135610

(51) Int. Cl.
*B60J 5/04* (2006.01)
*B62D 21/15* (2006.01)
(Continued)

(52) U.S. Cl.
CPC .......... *B60J 5/0455* (2013.01); *B62D 21/157* (2013.01); *B62D 25/025* (2013.01); *B62D 25/04* (2013.01); *B62D 25/06* (2013.01); *B62D 25/2036* (2013.01)

(58) Field of Classification Search
CPC ...... B60J 5/0455; B60J 5/0427; B60J 5/0456; B62D 21/157
(Continued)

(56) References Cited

U.S. PATENT DOCUMENTS

2015/0258878 A1  9/2015  Sugiyama
2017/0274936 A1*  9/2017  Ishii ..................... B62D 25/025

FOREIGN PATENT DOCUMENTS

DE  10 2004 029458 A1  1/2006
EP     3 025 888 A1  6/2016
(Continued)

OTHER PUBLICATIONS

The extended European search report issued by the European Patent Office dated Dec. 7, 2020, which corresponds to European Patent Application No. 20185922.0-1009 and is related to U.S. Appl. No. 16/931,329.

*Primary Examiner* — Dennis H Pedder
(74) *Attorney, Agent, or Firm* — Studebaker & Brackett PC

(57) ABSTRACT

A side door comprises a door panel portion and a reinforcement portion (a lower-side reinforcement portion and others). The door panel portion is provided to cover an opening portion for entrance and configured such that its peripheral part overlaps with an opening-portion-forming vehicle-body frame member (a side sill and others) in a vehicle side view. The reinforcement portion is provided at the peripheral part of the door panel portion such that it overlaps with the opening-portion-forming vehicle-body frame member in the vehicle side view, thereby reinforcing the peripheral part of the door panel portion against a collision load applied to the side door from a vehicle side. The reinforcement portion is provided at a portion of the peripheral part of the door panel portion which includes a part corresponding to the vehicle- (Continued)

width-direction-extending vehicle-body frame member (a first floor cross member and others).

7 Claims, 14 Drawing Sheets

(51) Int. Cl.
*B62D 25/02* (2006.01)
*B62D 25/04* (2006.01)
*B62D 25/06* (2006.01)
*B62D 25/20* (2006.01)

(58) Field of Classification Search
USPC .............................. 296/146.6, 146.5, 187.12
See application file for complete search history.

(56) References Cited

FOREIGN PATENT DOCUMENTS

| | | |
|---|---|---|
| EP | 3 219 590 A1 | 9/2017 |
| FR | 3 050 705 A1 | 11/2017 |
| JP | 2018-052138 A | 4/2018 |
| JP | 6540846 B1 * | 7/2019 ............. B62D 25/04 |

* cited by examiner

Left ⟷ Right

VEHICLE-BODY STRUCTURE OF VEHICLE

BACKGROUND OF THE INVENTION

The present invention relates to a vehicle-body structure of a vehicle.

Conventionally, in a vehicle which comprises a vehicle-body frame member (a center pillar, a side sill, and others) which forms an opening portion for entrance at a vehicle side part and a side door provided so as to open and close the opening portion, a structure of the side door to cope with a vehicle side collision has been developed (see Japanese Patent Laid-Open Publication No. 2018-52138, for example).

The above-described patent document discloses a door (side door) for a vehicle which is provided with panel portions which are arranged on a cabin inward side and on a cabin outward side, a frame portion which is arranged between the panel portions and configured to have a closed-cross section, and a reinforcement portion which is connected to the frame portion. The frame portion of the door for the vehicle comprises front and rear parts which respectively extend in a vertical direction at vehicle front-side and rear-side portions of the panel portions and a lower part which interconnects respective lower portions of the front and rear parts. The reinforcement portion comprises a first reinforcement which interconnects the above-described front and rear parts and a second reinforcement which interconnects the first reinforcement and the above-described lower part.

Herein, a vehicle-body structure of the vehicle is required to suppress a center pillar from coming into a cabin as much as possible in the vehicle side collision. Recently, weight reduction of the vehicle (light-weight vehicle) is also required from viewpoints of the fuel economy and the like. Therefore, it is necessary to compatibly attain the further weight reduction of the vehicle and increasing of the amount of absorption of the collision load (the collision-load absorption performance) in the vehicle side collision. In the door disclosed in the above-described patent document, however, since it is necessary to provide both the frame portion and the reinforcement portion, the weight of the door and therefore the weight of the vehicle is so increased that it may be difficult to satisfy the above-described requirements.

SUMMARY OF THE INVENTION

The present invention has been devised in view of the above-described matter, and an object of the present invention is to provide a vehicle-body structure of a vehicle which can compatibly attain the weight reduction of the vehicle and increasing of the amount of absorption of the collision load in the vehicle side collision.

The present invention is a vehicle-body structure of a vehicle, comprising an opening-portion-forming vehicle-body frame member forming an opening portion for entrance at a vehicle side part, a side door provided so as to open and close the opening portion, and a vehicle-width-direction-extending vehicle-body frame member extending in a vehicle width direction from a portion, in a peripheral direction of the opening portion, of the opening-portion-forming vehicle-body frame member, wherein the side door comprises a door panel portion and a reinforcement portion, the door panel portion being provided to cover the opening portion and configured such that a peripheral part thereof overlaps with the opening-portion-forming vehicle-body frame member in a vehicle side view (i.e., when viewed from the vehicle width direction), the reinforcement portion being provided at the peripheral part of the door panel portion such that the reinforcement portion overlaps with the opening-portion-forming vehicle-body frame member in the vehicle side view (i.e., when viewed from the vehicle width direction), thereby reinforcing the peripheral part of the door panel portion against a collision load applied to the side door from a vehicle side, and the reinforcement portion is provided at a portion of the peripheral part of the door panel portion which includes a part corresponding to the vehicle-width-direction-extending vehicle-body frame member.

According to the present invention, the side door closing the opening portion is moved (pushed) toward the cabin and comes to contact the vehicle-body frame member in the vehicle side collision. At this moment, the door panel portion of the side door receives a reaction load from the vehicle-body frame member in addition to the collision load. Since the reinforcement portion is provided to overlap with the opening-portion-forming vehicle-body frame member in the vehicle side view, the door panel portion has high rigidity against the reaction load from the opening-portion-forming vehicle-body frame member. Accordingly, deformation of the peripheral part of the door panel portion is suppressed by the reinforcement portion. Thereby, even if the door panel portion receives the collision load and the reaction load from the opening-portion-forming vehicle-body frame member, it is suppressed that the peripheral part of the door panel portion comes into the cabin through the opening portion of the opening-portion-forming vehicle-body frame member, so that the above-described peripheral part of the door panel portion remains contacting with the opening-portion-forming vehicle-body frame member (i.e., a connection state of the above-described portions of the peripheral part of the door panel portion and the vehicle-body frame member is maintained). Consequently, the collision load of the vehicle side collision is transmitted from the side door to the vehicle-body frame member, being dispersed to the peripheral part of the door panel portion.

Further, since the reinforcement portion is provided at the portion of the peripheral part of the door panel portion which corresponds to the vehicle-width-direction-extending vehicle-body frame member, the collision load of the vehicle side collision is properly transmitted to the vehicle-width-direction-extending vehicle-body frame member. Consequently, the above-described dispersion and transmission of the collision load of the vehicle side collision is effectively attained.

Meanwhile, the above-described reinforcement portion can be made of a plate member, for example. Thereby, it is unnecessary that the plate thickness of an impact bar which is conventionally provided is made thick or this impact bar is made of a frame member having a closed-cross section in order to increase the amount of absorption of the collision load in the vehicle side collision. It is also unnecessary that the number of impact bar is increased or a new impact bar is added. Consequently, any weight increase of the door panel portion, thereby any weight increase of the vehicle can be suppressed.

Accordingly, the weight reduction of the vehicle and increasing of the amount of absorption of the collision load in the vehicle side collision can be compatibly attained.

In an embodiment of the above-described vehicle-body structure of the vehicle according to the present invention, the reinforcement portion provided to overlap with a side sill which constitutes the opening-portion-forming vehicle-body frame member in the vehicle side view (i.e., when viewed from the vehicle width direction) is provided at the peripheral part of the door panel portion such that the reinforcement portion overlaps with a floor cross member which constitutes the vehicle-width-direction-extending vehicle-body frame member in the vehicle side view (i.e., when viewed from the vehicle width direction).

According to this embodiment, the peripheral part of the door panel, particularly its lower portion is so reinforced that the collision load of the vehicle side collision can be properly transmitted from this lower portion to the opening-portion-forming vehicle-body frame member (the side sill) and the vehicle-width-direction-extending vehicle-body frame member (the floor cross member).

In another embodiment of the above-described vehicle-body structure of the vehicle according to the present invention, the reinforcement portion provided to overlap with a hinge pillar which constitutes the opening-portion-forming vehicle-body frame member in the vehicle side view (i.e., when viewed from the vehicle width direction) is provided at the peripheral part of the door panel portion such that the reinforcement portion overlaps with an instrument-panel member which constitutes the vehicle-width-direction-extending vehicle-body frame member in the vehicle side view (i.e., when viewed from the vehicle width direction).

According to this embodiment, the peripheral part of the door panel, particularly its front-side portion is so reinforced that the collision load of the vehicle side collision can be properly transmitted from this front-side portion to the opening-portion-forming vehicle-body frame member (the hinge pillar) and the vehicle-width-direction-extending vehicle-body frame member (the instrument-panel member).

In further another embodiment of the above-described vehicle-body structure of the vehicle according to the present invention, the reinforcement portion provided to overlap with a roof side rail which constitutes the opening-portion-forming vehicle-body frame member in the vehicle side view (i.e., when viewed from the vehicle width direction) is provided at the peripheral part of the door panel portion such that at least a part of the reinforcement portion is located substantially at the same position, in a vehicle longitudinal direction, as a roof cross member which constitutes the vehicle-width-direction-extending vehicle-body frame member.

According to this embodiment, the peripheral part of the door panel, particularly its upper portion is so reinforced that the collision load of the vehicle side collision can be properly transmitted from this upper portion to the opening-portion-forming vehicle-body frame member (the roof side rail) and the vehicle-width-direction-extending vehicle-body frame member (the roof cross member).

The present invention will become apparent from the following description which refers to the accompanying drawings.

DETAILED DESCRIPTION OF THE INVENTION

Figure 1:
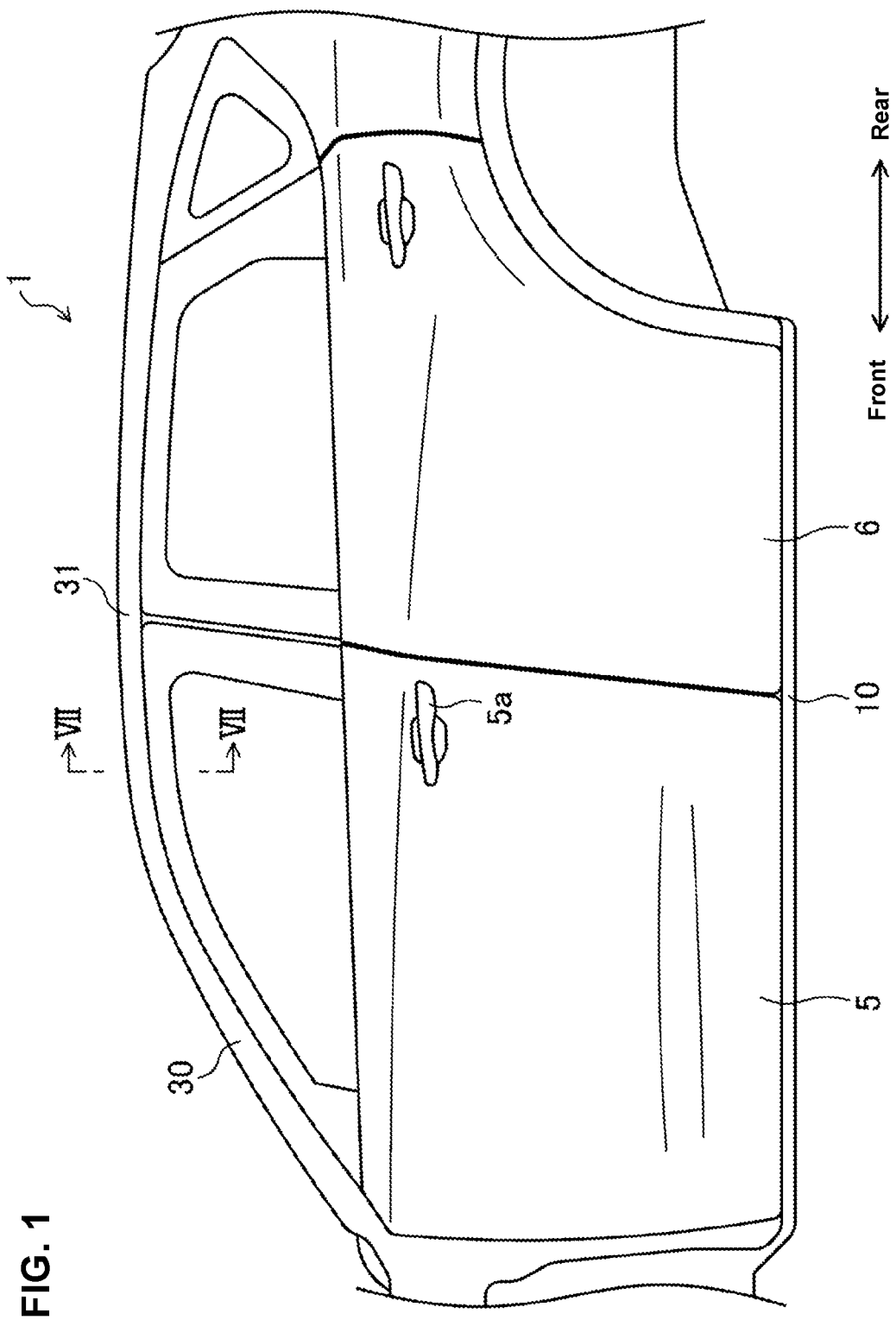
FIG. 1 is a side view showing a left-side side part of a vehicle provided with a vehicle-body structure of the vehicle according to an embodiment of the present invention, which shows around a front side door.

Hereafter, an embodiment of the present invention will be described referring to the drawings. In the following description, front, rear, left, right, upper and lower which respectively mean directions relative to a vehicle 1 will be simply referred to as "front," "rear," "left," "right," "upper," and "lower."

FIG. 1 shows a left-side side part of the vehicle 1 to which a vehicle-body structure according to the present embodiment is applied. The vehicle 1 is a 4-door type of passenger car. In the present embodiment, since the vehicle-body structure of the vehicle 1 is configured to be laterally symmetrical, the vehicle-body structure of the left-side part of the vehicle 1 will be described specifically only, and detailed explanation of the one of a right-side part of the vehicle 1 will be omitted. Further, in the following description, there is a case where an inward side, in a vehicle width direction, of the vehicle 1 will be simply referred to as "right side" and also an outward side, in the vehicle width direction, of the vehicle 1 will be simply referred to as "left side."

Figure 2:
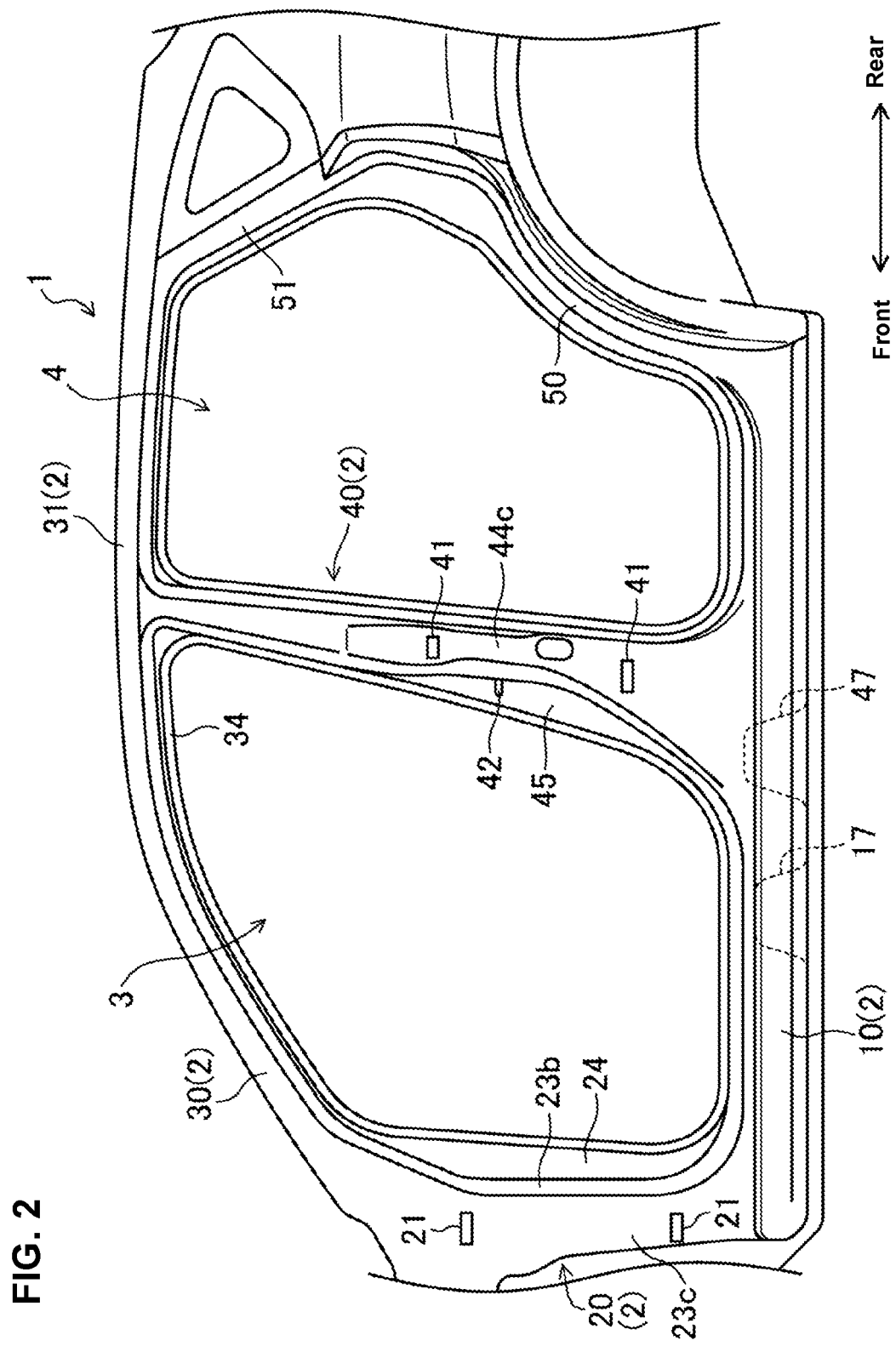
FIG. 2 is a side view showing a vehicle-body frame member at the left-side side part of the vehicle.

The vehicle 1 comprises, as shown in FIGS. 1 and 2, a vehicle-body frame member 2 which forms front-side and rear-side opening portions for entrance 3, 4 at its left-side side part, through which a passenger gets on or gets off. A front side door 5 is arranged at the front-side opening portion 3 so as to open and close this opening portion 3. A rear side door 6 is arranged at the rear-side opening portion 4 so as to open and close this opening portion 4.

The vehicle-body frame member 2 comprises, as shown in FIG. 2, a side sill 10 which is arranged at a lower part of the vehicle 1 and extends in a longitudinal direction, a hinge pillar 20 which extends upwardly from a front-side end portion of the side sill 10, a front pillar 30 which extends obliquely rearwardly-and-upwardly from an upper-side end portion of the hinge pillar 20, and a roof side rail 31 which continuously extends rearwardly from a rear-side end portion of the front pillar 30. The vehicle-body frame member 2 further comprises a center pillar 40 which extends in a vertical direction and interconnects a central part, in the longitudinal direction, of the side sill 10 and a central part, in the longitudinal direction, of the roof side rail 31. The front-side opening portion 3 is partitioned by the side sill 10, the hinge pillar 20, the front pillar 30, the roof side rail 31, and the center pillar 40.

Further, the vehicle-body frame member 2 comprises a wheel arch 50 which extends upwardly-and-rearwardly in an arch shape from a rear-side end portion of the side sill 10 and forms a part of a wheel house and a quarter pillar 51 which extends vertically and interconnects the wheel arch 50 and the roof side rail 31. The rear-side opening portion 4 is partitioned by the side sill 10, the roof side rail 31, the center pillar 40, the wheel arch 50, and the quarter pillar 51.

Figure 4:
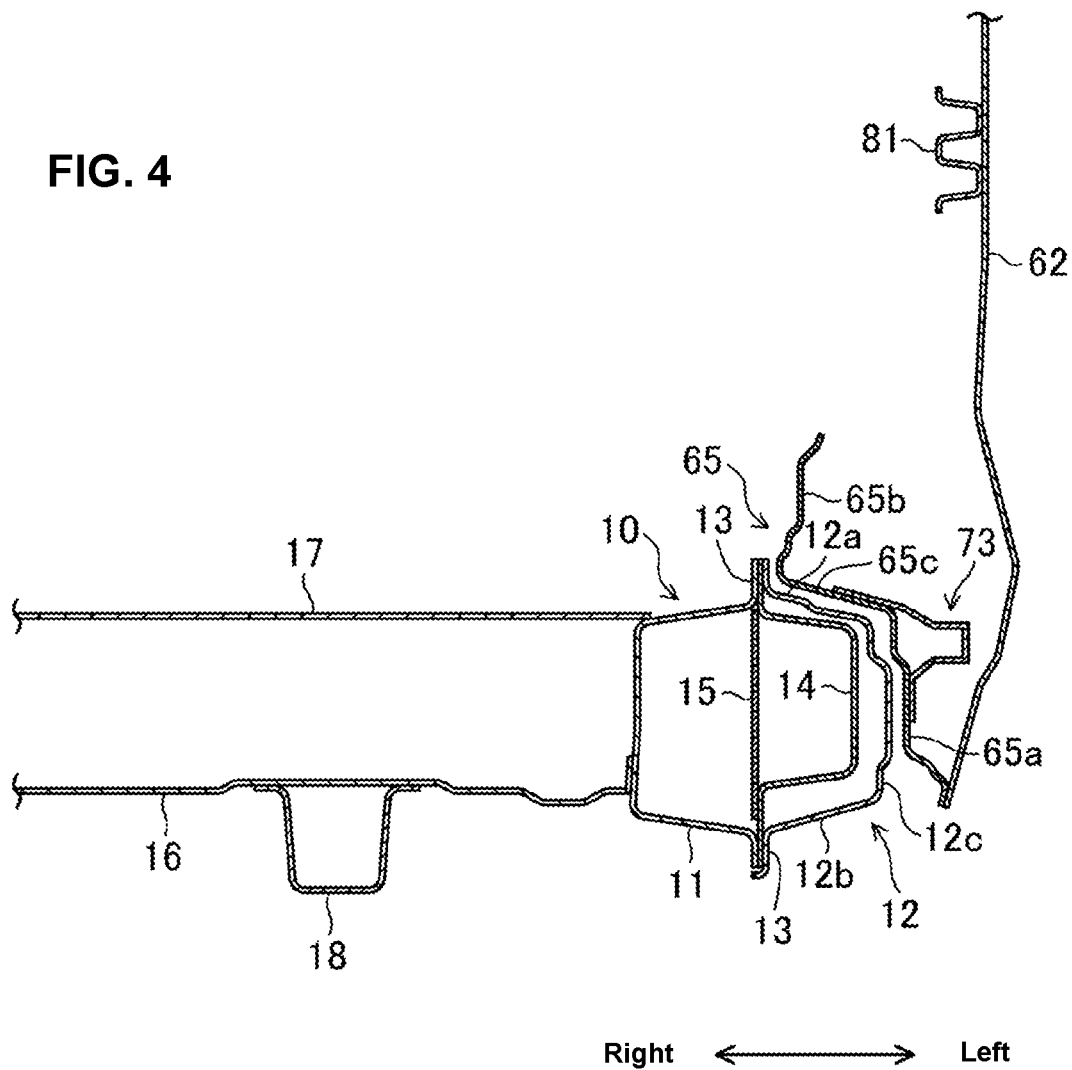
FIG. 4 is a sectional view taken along line IV-IV of FIG. 3.

The side sill 10 comprises, as shown in FIG. 4, a side-sill inner panel 11 which is positioned on the inward side, in the vehicle width direction, of the vehicle 1 (on the right side in this figure) and has a hat-shaped cross section and a side-sill outer panel 12 which is positioned on the outward side, in the vehicle width direction, of the vehicle 1 (on the left side in this figure) and has a hat-shaped cross section. The cross section of the side-sill inner panel 11 is opened to the left side, and the cross section of the side-sill outer panel 12 is opened to the right side. Each of the side-sill inner panel 11 and the side-sill outer panel 12 has side-sill flanges 13 which extend in the vertical direction and in the longitudinal direction at its upper-side end portion and its lower-side end portion. The respective side-sill flanges 13 overlap with each other in the vehicle width direction and are welded together. Thus, a closed-cross section is formed by the side-sill inner panel 11 and the side-sill outer panel 12.

The side-sill outer panel 12 comprises, as shown in FIG. 4, a side-sill upper wall portion 12a which extends toward the left side from a lower-side end portion of the upper-side side-sill flange 13, a side-sill lower wall portion 12b which extends, facing the side-sill upper wall portion 12a in the vertical direction, and a side-sill side wall portion 12c which interconnects a left-side end portion of the side-sill upper wall portion 12a and a left-side end portion of the side-sill lower wall portion 12b in the vertical direction.

A first side-sill reinforcement 14 and a second side-sill reinforcement 15 are provided inside the side sill 10. The first side-sill reinforcement 14 is configured to have a hat-shaped cross section which is opened to the right side, and arranged along the side-sill outer panel 12. The second side-sill reinforcement 15 is of a flat plate shape. Respective end portion, in the vertical direction, of the first side-sill reinforcement 14 overlap with the respective side-sill flanges 13 in the vehicle width direction and are welded together with the side-sill flanges 13.

As shown in FIG. 4, a left-side end portion of a floor panel 16 which expands in the longitudinal direction and in the vehicle width direction is joined to a lower-side portion of the side-sill inner panel 11. Further, a left-side end portion of a first floor cross member 17 which extends in the vehicle width direction is joined to an upper-side portion of the side-sill inner panel 11. A floor side rail 18 which extends in the longitudinal direction is joined to a lower face of the floor panel 16. The first floor cross member 17 is a vehicle-width-direction-extending vehicle-body frame member which extends in the vehicle width direction.

The hinge pillar 20 comprises two front-door hinges 21 to support the front side door 5 (see FIG. 2). The two front-door hinges 21 are provided to be spaced apart from each other in the vertical direction.

Figure 5:
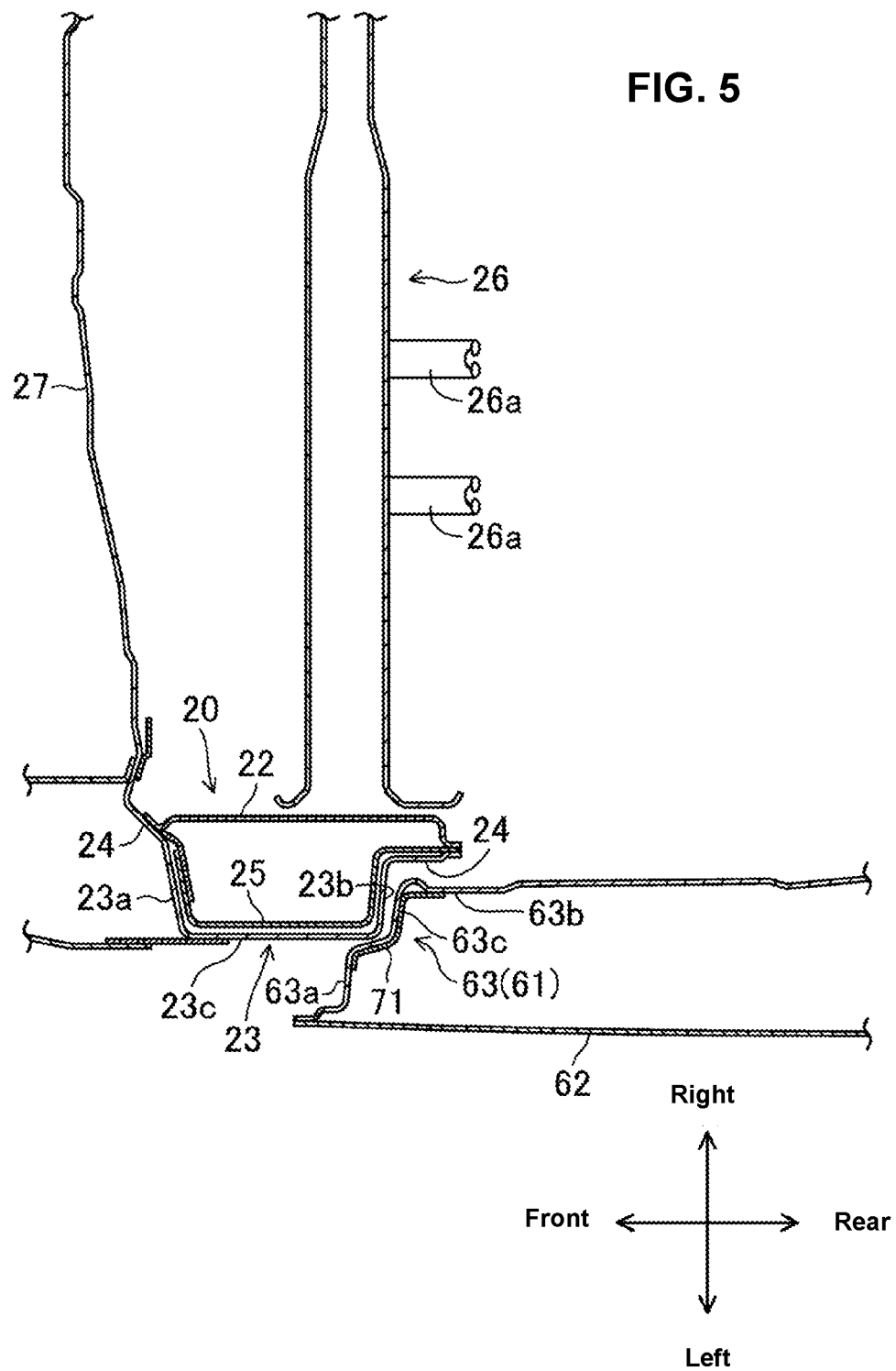
FIG. 5 is a sectional view taken along line V-V of FIG. 3.

The hinge pillar 20 comprises, as shown in FIG. 5, a hinge-pillar inner panel 22 which is positioned on the inward side, in the vehicle width direction, of the vehicle 1 (on the right side in this figure) and has a hat-shaped cross section and a hinge-pillar outer panel 23 which is positioned on the outward side, in the vehicle width direction, of the vehicle 1 (on the left side in this figure) and has a hat-shaped cross section. The cross section of the hinge-pillar inner panel 22 is opened to the left side, and the cross section of the hinge-pillar outer panel 23 is opened to the right side. Each of the hinge-pillar inner panel 22 and the hinge-pillar outer panel 23 has hinge-pillar flanges 24 which extend in the vertical direction and in the longitudinal direction at its front-side end portion and its rear-side end portion. The respective hinge-pillar flanges 24 overlap with each other in the vehicle width direction and are welded together. Thus, a closed-cross section is formed by the hinge-pillar inner panel 22 and the hinge-pillar outer panel 23.

The hinge-pillar outer panel 23 comprises, as shown in FIG. 5, a hinge-pillar front wall portion 23a which extends toward the left side from a rear-side end portion of the upper-side hinge-pillar flange 24, a hinge-pillar rear wall portion 23b which extends, facing the hinge-pillar front wall portion 23a in the longitudinal direction, and a hinge-pillar side wall portion 23c which interconnects a left-side end portion of the hinge-pillar front wall portion 23a and a left-side end portion of the hinge-pillar rear wall portion 23b in the longitudinal direction.

A hinge-pillar reinforcement 25 is provided inside the hinge pillar 20. The hinge-pillar reinforcement 25 is configured to have a hat-shaped cross section which is opened to the right side, and arranged along the hinge-pillar outer panel 23. Respective end portions, in the longitudinal direction, of the hinge-pillar reinforcement 25 overlap with the respective hinge-pillar flanges 24 in the vehicle width direction and are welded together with the hinge-pillar flanges 24.

As shown in FIG. 5, a left-side end portion of an instrument-panel member 26 extending in the vehicle width direction is joined to an upper part of the hinge-pillar inner panel 22. The instrument-panel member 26 is provided with hinges 26a to pivotably support a glove box in the vertical direction and others. A dash panel 27 which partitions a cabin from an engine room is joined to a front-side end portion of the hinge-pillar inner panel 22. The instrument-panel member 26 is another vehicle-width-direction-extending frame member.

As shown in FIG. 2, the center pillar 40 is provided with two rear-door hinges 41 to support the openable rear side door 6. The two rear-door hinges 41 are provided to be spaced apart from each other in the vertical direction. The center pillar 40 is further provided with a striker 42 at its front-side position which is located slightly below the upper-side rear-door hinge 41. The striker 42 is a member to lock the front side door 5 in a closed state.

Figure 6:
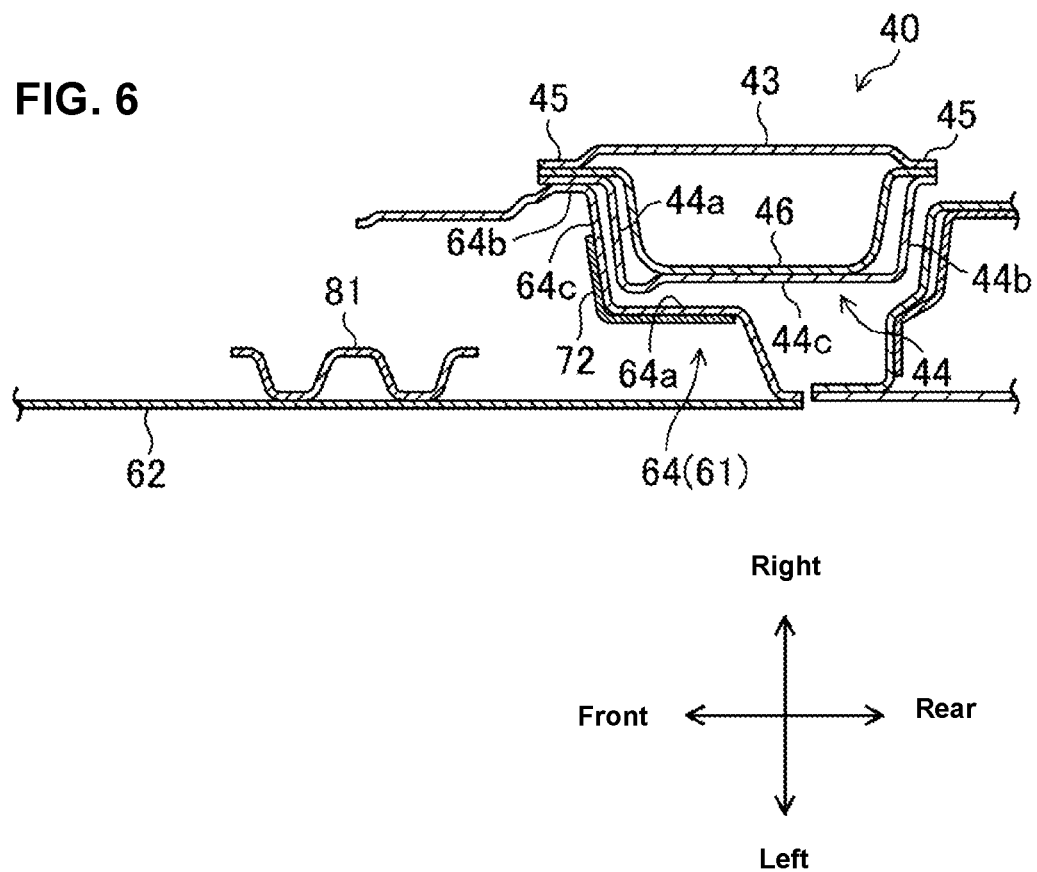
FIG. 6 is a sectional view taken along line VI-VI of FIG. 3.

The center pillar 40 comprises, as shown in FIG. 6, a center-pillar inner panel 43 which is positioned on the inward side, in the vehicle width direction, of the vehicle 1 (on the right side in this figure) and has a hat-shaped cross section and a center-pillar outer panel 44 which is positioned on the outward side, in the vehicle width direction, of the vehicle 1 (on the left side in this figure) and has a hat-shaped cross section. The cross section of the center-pillar inner panel 43 is opened to the left side, and the cross section of the center-pillar outer panel 44 is opened to the right side. Each of the center-pillar inner panel 43 and the center-pillar outer panel 44 has center-pillar flanges 45 which extend in the vertical direction and in the longitudinal direction at its front-side end portion and its rear-side end portion. The respective center-pillar flanges 45 overlap with each other in the vehicle width direction and are welded together. Thus, a closed-cross section is formed by the center-pillar inner panel 43 and the center-pillar outer panel 44.

The center-pillar outer panel 44 comprises, as shown in FIG. 6, a center-pillar front wall portion 44a which extends toward the left side from a rear-side end portion of the front-side center-pillar flange 45, a center-pillar rear wall portion 44b which extends, facing the center-pillar front wall portion 44a in the longitudinal direction, and a center-pillar side wall portion 44c which interconnects a left-side end portion of the center-pillar front wall portion 44a and a left-side end portion of the center-pillar rear wall portion 44b in the longitudinal direction.

A center-pillar reinforcement 46 is provided inside the center pillar 40. The center-pillar reinforcement 46 is configured to have a hat-shaped cross section which is opened to the right side, and arranged along the center-pillar outer panel 44. Respective end portion, in the longitudinal direction, of the center-pillar reinforcement 46 overlap with the respective center-pillar flanges 45 in the vehicle width direction and are welded together with the center-pillar flanges 45.

As shown in FIG. 2, a lower-side end portion of the center pillar 40 is located substantially at the same position as a second floor cross member 47. The second floor cross member 47 is another vehicle-width-direction-extending vehicle-body frame member.

Figure 7:
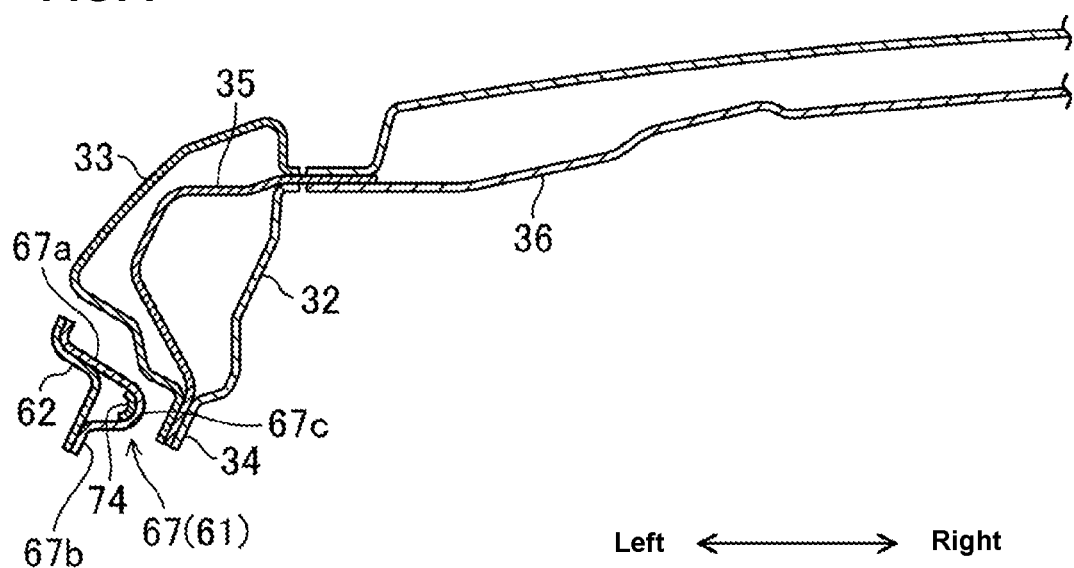
FIG. 7 is a sectional view taken along line VII-VII of FIG. 1.

The roof side rail 31 comprises, as shown in FIG. 7, a roof-side inner panel 32 which is positioned on the inward side, in the vehicle width direction, of the vehicle 1 (on the right side in this figure) and a roof-side outer panel 33 which is positioned on the outward side, in the vehicle width direction, of the vehicle 1 (on the left side in this figure) and has a C-shaped cross section. The cross section of the roof-side outer panel 33 is opened to the right side. The roof-side outer panel 33 has a roof-side flange 34 which extends in the vertical direction and in the longitudinal direction at its lower-side end portion. The roof-side flange 34 overlaps with a lower-side end portion of the roof-side inner panel 32 in the vehicle width direction and these are welded together. An upper-side end portion of the roof-side outer panel 33 overlaps with an upper-side end portion of the roof-side inner panel 32 in the vehicle width direction and these are welded together. Thus, a closed-cross section is formed by the roof-side inner panel 32 and the roof-side outer panel 33.

A roof-side reinforcement 35 is provided inside the roof side rail 31. The roof-side reinforcement 35 is configured to have a hat-shaped cross section which is opened to the right side, and arranged along the roof-side outer panel 33. A lower-side end portion of the roof-side reinforcement 35 overlaps with a lower-side end portion of the roof-side inner panel 32 and the roof-side flange 34 of the roof-side outer panel 33 in the vehicle width direction and these are welded together. Meanwhile, an upper-side end portion of the roof-side reinforcement 35 overlaps with an upper-side end portion of the roof-side inner panel 32 and an upper-side end portion of the roof-side outer panel 33 in the vehicle width direction and these are welded together.

As shown in FIG. 7, a roof cross member 36 which extends in the vehicle width direction is provided on the right side of the roof side rail 31. A left-side end portion of the roof cross member 36 is joined to the roof side rail 31. The roof cross member 36 is another vehicle-width-direction-extending vehicle-body frame member.

Herein, a structure of a cross section of the front pillar 30 is similar to that of a cross section of the roof side rail 31 which is continuous to the front pillar 30.

Next, the front side door 5 will be described as an example of a side-door structure. In the following description, a state where the front side door 5 closes the front-side opening portion 3 is a premise. Herein, while detailed description of the rear side door 6 is omitted, the rear side door 6 has substantially the same structure as the front side door 5 except a shape of its door panel portion 60 and arrangement and a shape of its reinforcement portions, which will be described later.

The front side door 5 comprises, as shown in FIGS. 4-8, the door panel portion 60 which has a door inner panel 61 which is positioned on the inward side, in the vehicle width direction, of the vehicle (on the right side in this figure) and a door outer panel 62 which is positioned on the outward side, in the vehicle width direction, of the vehicle (on the left side in this figure). The door inner panel 61 and the door outer panel 62 are welded together so as to have a closed-cross section formed thereby. A door trim is joined to a face of the door inner panel 61 which is opposite to the door outer panel 62, which is not illustrated. The door panel portion 60 (the door inner panel 61 and the door outer panel 62) closes the front-side opening portion 3, and the peripheral part of the door panel portion 60 covering the front-side opening portion 3 overlaps with the vehicle-body frame member 2 in a vehicle side view (i.e., when viewed from the vehicle width direction).

Figure 3:
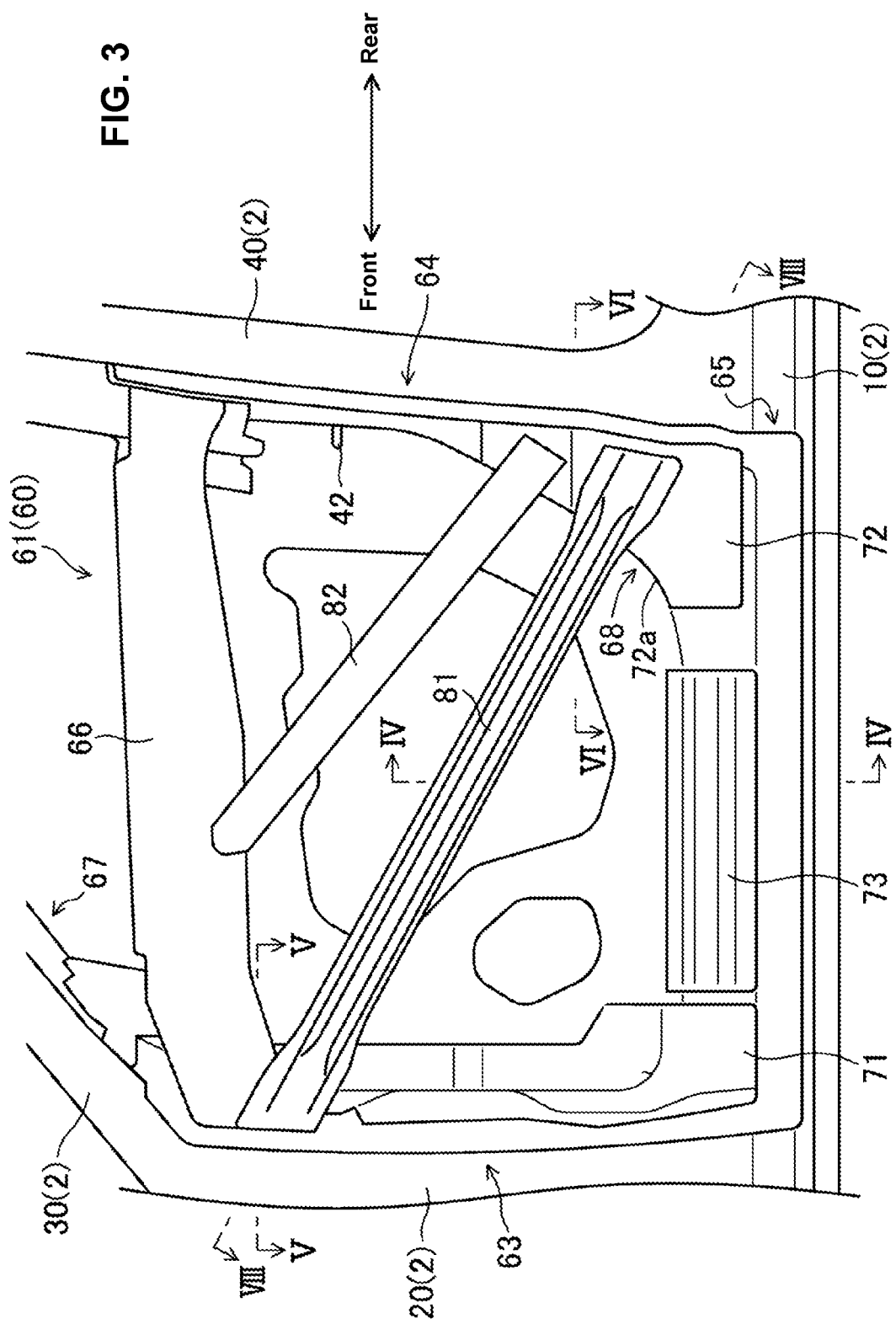
FIG. 3 is a side view showing a state where an outer panel of the front side door is removed, when viewed from a vehicle left side, which shows a lower part below a beltline.

The door inner panel 61 is made of a single-sheet steel plate. The door inner panel 61 is configured such that its peripheral part is positioned along a periphery of the front-side opening portion 3 (the vehicle-body frame member 2) as shown in FIG. 3. The door inner panel 61 comprises an inner front portion 63 which extends in the vertical direction along the hinge pillar 20, an inner rear portion 64 which extends in the vertical direction along a lower part of the center pillar 40, and an inner lower portion 65 which extends along the side sill 10 and interconnects a lower-side end portion of the inner front portion 63 and a lower-side end portion of the inner rear portion 64. The door inner panel 61 further comprises a beltline portion 66 which extends straightly in the longitudinal direction and interconnects an upper-side end portion of the inner front portion 63 and an upper-side end portion of the inner rear portion 64. The door inner panel 61 further comprises a window frame portion 67 which forms a quarter-window opening portion which is closed with a window glass together with the beltline portion 66.

In the vehicle side view (i.e., when viewed from the vehicle width direction), the inner front portion 63 overlaps with the hinge pillar 20, the inner rear portion 64 overlaps with the center pillar 40, the inner lower portion 65 overlaps with the side sill 10, and the window frame portion 67 overlaps with the front pillar 30 and the roof side rail 31.

The door inner panel 61 is provided with a curved wall portion 68 which is provided at an inside part of a corner portion which is positioned between the inner rear portion 64 and the inner lower portion 65 (i.e., a corner portion which is formed at a peripheral portion of the door inner panel 61 and corresponds to a connection portion of the side sill 10 and the center pillar 40). This curved wall portion 68 is configured to be smoothly curved from the inner rear portion 64 toward the inner lower portion 65 in the vehicle side view (i.e., when viewed from the vehicle width direction) (see FIGS. 3 and 9). That is, the curved wall portion 68 is curved forwardly and downwardly in the vehicle side view. Thus, the curved wall portion 68 is curved convexly toward an outside part of the corner portion positioned between the inner rear portion 64 and the inner lower portion 65 in the vehicle side view. The curved wall portion 68 extends in the vehicle width direction and in a peripheral direction of the peripheral portion of the door inner panel 61.

The inner front portion 63 comprises, as shown in FIG. 5, a front-side outer wall portion 63a which is positioned at the outside, in a surface direction, of the door inner panel 61 (on the front side in this figure), a front-side inner wall portion 63b which is positioned on the inside, in the surface direction, (on the rear side in this figure) of the front-side outer wall portion 63a, and a front-side connection wall portion 63c which interconnects the front-side outer wall portion 63a and the front-side inner wall portion 63b in the vehicle width direction. Herein, the surface direction of the door inner panel 61 (the surface direction of the door panel portion 60) matches a surface direction of the front-side opening portion 3.

The front-side outer wall portion 63a comprises a part which expands in the longitudinal direction and in the vertical direction (which extends substantially along the surface direction of the front-side opening portion 3) and another part which expands (extends) in the vehicle width direction and in the vertical direction continuously from a front-side end portion of the above-described part. The front-side inner wall portion 63b expands in the longitudinal direction and in the vertical direction. The front-side connection wall portion 63c expands in the vehicle width direction and in the vertical direction (extends in the vehicle width direction and in the peripheral direction of the peripheral portion of the door inner panel 61) so as to interconnect a rear-side end portion of the front-side outer wall portion 63a and a front-side end portion of the front-side inner wall portion 63b. The front-side connection wall portion 63c forms a ridgeline between the front-side outer wall portion 63a and the front-side connection wall portion 63c. The front-side outer wall portion 63a extends in the vertical direction such that this portion 63a overlaps with the rear-side hinge-pillar flange 24 and the hinge-pillar side wall portion 23c of the hinge pillar 20 in the vehicle side view (i.e., when viewed from the vehicle width direction). The front-side inner wall portion 63b extends in the vertical direction such that this portion 63b overlaps with the rear-side hinge-pillar flange 24 of the hinge pillar 20 in the vehicle side view (i.e., when viewed from the vehicle width direction).

The inner rear portion 64 comprises, as shown in FIG. 6, a rear-side outer wall portion 64a which is positioned at the outside, in the surface direction, of the door inner panel 61 (on the rear side in this figure), a rear-side inner wall portion 64b which is positioned on the inside, in the surface direction, (on the front side in this figure) of the rear-side outer wall portion 64a, and a rear-side connection wall portion 64c which interconnects the rear-side outer wall portion 64a and the rear-side inner wall portion 64b in the vehicle width direction.

The rear-side outer wall portion 64a comprises a part which expands in the longitudinal direction and in the vertical direction (which extends substantially along the surface direction of the front-side opening portion 3) and another part which expands (extends) in the vehicle width direction and in the vertical direction continuously from a rear-side end portion of the above-described part. The rear-side inner wall portion 64b expands in the longitudinal direction and in the vertical direction. The rear-side connection wall portion 64c expands in the vehicle width direction and in the vertical direction (extends in the vehicle width direction and in the peripheral direction of the peripheral portion of the door inner panel 61) so as to interconnect a front-side end portion of the rear-side outer wall portion 64a and a rear-side end portion of the rear-side inner wall portion 64b. A ridgeline is formed between the rear-side connection wall portion 64c and the rear-side outer wall portion 64a. The rear-side outer wall portion 64a extends in the vertical direction such that this portion 64a overlaps with the front-side center-pillar flange 45 and the center-pillar side wall portion 44c of the center pillar 40 in the vehicle side view (i.e., when viewed from the vehicle width direction). The rear-side inner wall portion 64b extends in the vertical direction such that this portion 64b overlaps with the front-side center-pillar flange 45 of the center pillar 40 in the vehicle side view (i.e., when viewed from the vehicle width direction).

An opening portion for exposing the striker 42 to a door inside (to a space between the door inner panel 61 and the door outer panel 62) is provided at a part of the door-inner rear portion 64 which corresponds to the striker 42. A door latch is provided at a position of this opening portion of the inner rear portion 64, which is not illustrated. An engagement state of this door latch with the striker 42 is controlled by operating a door handle 5a (see FIG. 1).

The inner lower portion 65 comprises, as shown in FIG. 4, a lower-side outer wall portion 65a which is positioned at the outside, in the surface direction, of the door inner panel 61 (on the lower side in this figure), a lower-side inner wall portion 65b which is positioned on the inside, in the surface direction, (on the upper side in this figure) of the lower-side outer wall portion 65a, and a lower-side connection wall portion 65c which interconnects the lower-side outer wall portion 65a and the lower-side inner wall portion 65b in the vehicle width direction.

The lower-side outer wall portion 65a and the lower-side inner wall portion 65b expand in the longitudinal direction and in the vertical direction (which extends substantially along the surface direction of the front-side opening portion 3). The lower-side connection wall portion 65c expands in the vehicle width direction and in the longitudinal direction (extends in the vehicle width direction and in the peripheral direction of the peripheral portion of the door inner panel 61) so as to interconnect an upper-side end portion of the lower-side outer wall portion 65a and a lower-side end portion of the lower-side inner wall portion 65b. A ridgeline is formed between the lower-side connection wall portion 65c and the lower-side outer wall portion 65a. The lower-side outer wall portion 65a extends in the longitudinal direction such that this portion 65a overlaps with the upper-side side-sill flange 13 and the side-sill side wall portion 12c of the side sill 10 in the vehicle side view (i.e., when viewed from the vehicle width direction). The lower-side inner wall portion 65b extends in the longitudinal direction such that this portion 65b overlaps with the upper-side side-sill flange 13 of the side sill 10 in the vehicle side view (i.e., when viewed from the vehicle width direction).

The rear-side connection wall portion 64c and the lower-side connection wall portion 65c are smoothly connected by the curved wall portion 68, and the front-side connection wall portion 63c and the lower-side connection wall portion 65c are smoothly connected by the above-described front-lower curved wall portion provided at the inside part of the corner portion positioned between the inner front portion 63 and the inner lower portion 65.

The window frame portion 67 comprises, as shown in FIG. 7, an upper-side outer wall portion 67a which is positioned at the outside, in the surface direction, of the door inner panel 61 (on the upper side in this figure), an upper-side inner wall portion 67b which is positioned on the inside, in the surface direction, of the door inner panel 61 (on the lower side in this figure) relative to the upper-side outer wall portion 67a, and an upper-side connection wall portion 67c which interconnects the upper-side outer wall portion 67a and the upper-side inner wall portion 67b in the vertical direction and in the vehicle width direction. The upper-side outer wall portion 67a expands in the longitudinal direction and in the vehicle width direction and slants downwardly toward the right side. The upper-side inner wall portion 67b expands in the longitudinal direction and in the vertical direction. The lower-side connection wall portion 65c is curved downwardly toward the left side from a right-side end portion of the upper-side outer wall portion 67a so as to interconnect a right-side end portion of the upper-side outer wall portion 67a and an upper-side end portion of the upper-side inner wall portion 67b. The upper-side outer wall portion 67a and the upper-side connection portion 67c extend such that they overlap with the roof-side flange 34 in the vehicle sideview (i.e., when viewed from the vehicle width direction).

As shown in FIG. 3, a first impact bar 81 which is made of a plate member and a second impact bar 82 are attached to the door inner panel 61. The first impact bar 81 extends obliquely rearwardly-and-downwardly and interconnects an upper-side end portion of the inner front portion 63 and a lower-side end portion of the inner rear portion 64. The second impact bar 82 extends obliquely rearwardly-and-downwardly so as to interconnect a middle part, in the longitudinal direction, of the beltline portion 66 and a middle part, in the vertical direction, of the inner rear portion 64. The first impact bar 81 is configured such that both-side end portions, in the longitudinal direction, thereof have a hat-shaped cross section and a middle portion, in the longitudinal direction, thereof has an M-shaped cross section as shown in FIGS. 4 and 6.

As shown in FIGS. 3-8, plural reinforcement portions are provided at the peripheral portion of the door inner panel 61, wherein the peripheral portion of the door inner panel 61 is reinforced by the reinforcement portions against a collision load which is inputted (applied) to the front side door 5 from an outward side, in the vehicle width direction, of the front side door 5. Specifically, the reinforcement portions include a front-side reinforcement portion 71 which is provided along the inner front portion 63, a rear-side reinforcement portion 72 which is provided along the inner rear portion 64, a lower-side reinforcement portion 73 which is provided along the inner lower portion 65, and an upper-side reinforcement portion 74 which is provided at the window frame portion 67. The reinforcement portions 71-74 may be made of a plate member, which is made from hot material, for example.

The front-side reinforcement portion 71 is, as shown in FIG. 3, a patch member which is attached along the front-side outer wall portion 63a, the front-side inner wall portion 63b, and the front-side connection wall portion 63c. That is, the front-side reinforcement portion 71 is provided to straddle a ridgeline between the front-side outer wall portion 63a and the front-side connection wall portion 63c, whereby the inner front portion 63 (particularly, the front-side connection wall portion 63c) is reinforced against the collision load.

The front-side reinforcement portion 71 is, as shown in FIG. 5, provided to overlap with the hinge-pillar side wall portion 23c of the hinge pillar 20 in the vehicle side view (i.e., when viewed from the vehicle width direction). Further, the front-side reinforcement portion 71 is provided substantially over an entire part of the inner front portion 63, including a portion of the peripheral portion of the door inner panel 61 (an upper part of the inner front portion 63) which corresponds to the instrument-panel member 26. That is, the front-side reinforcement portion 71 is provided at the peripheral portion of the door inner panel 61 so as to overlap with the instrument-panel member 26 in the vehicle side view (i.e., when viewed from the vehicle width direction).

Figure 8:
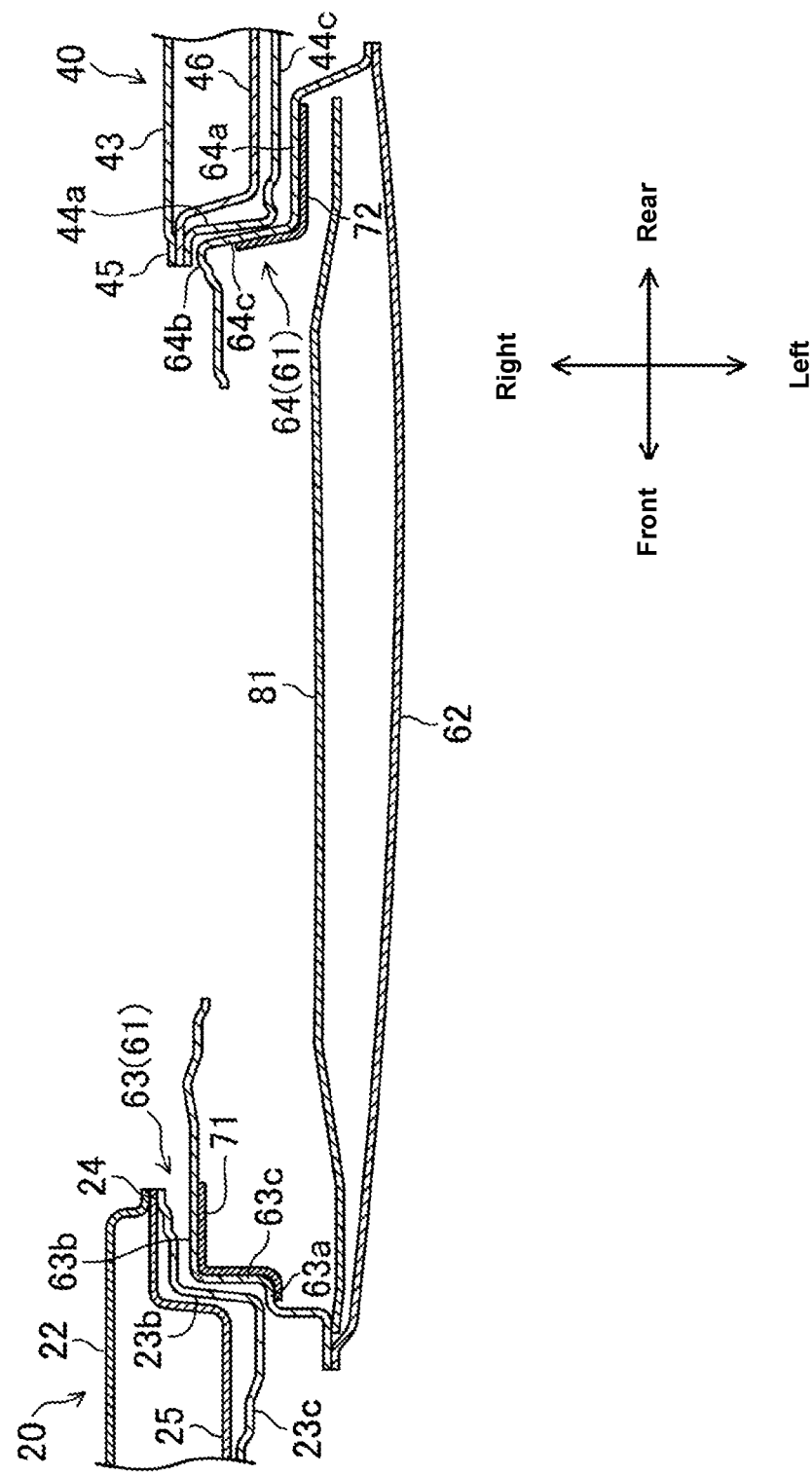
FIG. 8 is a sectional view taken along line VIII-VIII of FIG. 3.

The front-side reinforcement portion 71 is provided to overlap with an upper-side end portion of the first impact bar 81 in the vehicle side view (i.e., when viewed from the vehicle width direction) as shown in FIGS. 3 and 8. The front-side reinforcement portion 71 is welded to the inner front portion 63 in a state where this portion 71 overlaps with the first impact bar 81 and the inner front portion 63 (specifically, the front-side outer wall portion 63a) at a joint position of the first impact bar 81 to the door inner panel 61, which is not illustrated.

Figure 9:
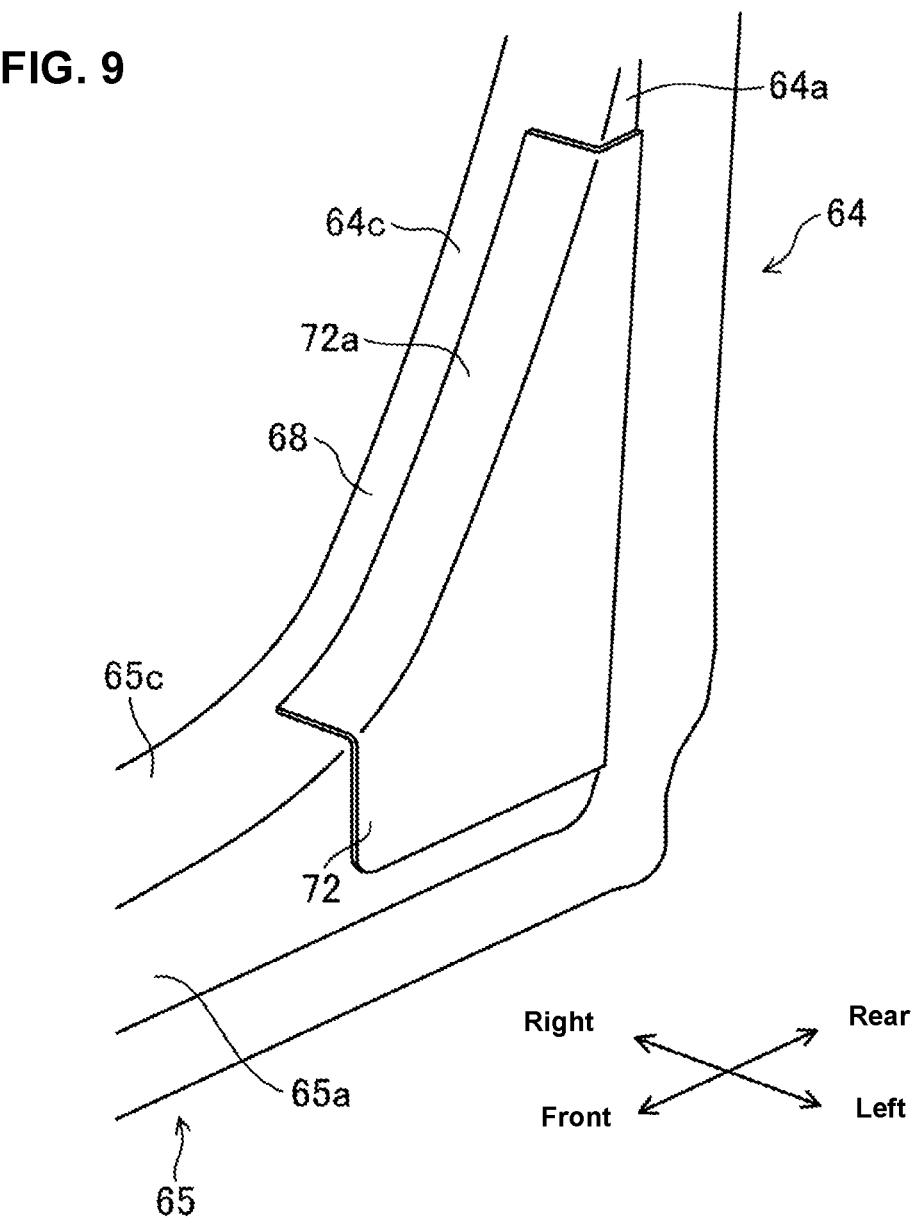
FIG. 9 is a perspective view showing a corner portion of a peripheral part of a door panel portion (door inner panel) of the front side door which corresponds to a connection portion of a side sill and a center pillar, which viewed from an upper-front outward side, in a vehicle width direction, of the vehicle.

The rear-side reinforcement portion 72 is a patch member which is attached along the rear-side outer wall portion 64a, the rear-side connection wall portion 64c, the curved wall portion 68, and a corner portion positioned between the rear-side outer wall portion 64a and the lower-side outer wall 65a as shown in FIGS. 3, 6 and 9. That is, the rear-side reinforcement portion 72 is provided to straddle a ridgeline between the rear-side outer wall portion 64a and the rear-side connection wall portion 64c and a ridgeline between the curved wall portion 68 and the above-described corner portion, whereby the inner rear portion 64 (particularly, the rear-side connection wall portion 64c) and the corner portion positioned between the inner rear portion 64 and the inner lower portion 65 (particularly, the curved wall portion 68) are reinforced against the above-described collision load.

The rear-side reinforcement portion 72 is, as shown in FIG. 6, provided to overlap with the front-side center-pillar flange 45 and the center-pillar-side wall portion 44c of the center pillar 40 in the vehicle side view (i.e., when viewed from the vehicle width direction). The rear-side reinforcement portion 72 is provided at a lower-side part of the inner rear portion 64 and the corner portion positioned between the inner rear portion 64 and the inner lower 65 of the peripheral portion of the door inner panel 61. A portion of the rear-side reinforcement portion 72 which corresponds to the above-described corner portion (a front-side lower portion of the rear-side reinforcement portion 72) is provided at a portion of the peripheral portion of the door inner panel 61 which corresponds to the second floor cross member 47. That is, the front-side lower portion of the rear-side reinforcement portion 72 is located substantially at the same position, in the longitudinal direction, as the second floor cross member 47.

The rear-side reinforcement portion 72 is, as shown in FIGS. 3 and 8, provided to overlap with a lower-side end portion of the first impact bar 81 in the vehicle side view (i.e., when viewed from the vehicle width direction). The lower-side end portion of the first impact bar 81 is fixed to the corner portion positioned between the inner rear portion 64 and the inner lower portion 65 (i.e., the corner portion which is formed at the peripheral portion of the door inner panel 61 and corresponds to a connection portion of the side sill 10 and the center pillar 40). The rear-side reinforcement portion 72 is welded to the inner rear portion 64 in a state where this portion 72 overlaps with the first impact bar 81 and the inner rear portion 64 (specifically, the rear-side outer wall portion 64a) at a joint position of the first impact bar 81 to the door inner panel 61, which is not illustrated.

As shown in FIG. 9, the rear-side reinforcement portion 72 is provided with a rear-side curved portion 72a at an inside part of the corner portion positioned between the inner rear portion 64 and the inner lower portion 65 where the rear-side reinforcement portion 72 is provided. This curved portion 72a is configured to be curved convexly toward an outside part of the above-described corner portion in the vehicle side view (i.e., when viewed from the vehicle width direction). The curved portion 72a extends along the above-described curved wall portion 68 and is fixed to this curved wall portion 68. That is, the rear-side curved portion 72a extends in the vehicle width direction and in the peripheral direction of the peripheral portion of the door inner panel 61 as well as the curved wall portion 68. The curved portion 72a is continuous to a portion of the rear-side reinforcement portion 72 which is attached and fixed to the rear-side connection wall portion 64c.

The lower-side reinforcement portion 73 is, as shown in FIG. 4, configured to have a U-shaped cross section which is opened to the right side and to form a closed-cross section cooperatively with the side sill 10. Specifically, the lower-side reinforcement portion 73 is joined to the lower-side outer wall portion 65a and the lower-side connection wall portion 65c such that this portion 73 straddles the ridgeline between the lower-side outer wall portion 65a and the lower-side connection wall portion 65c and thereby the closed-cross section is formed. Thereby, the lower-side reinforcement portion 73 reinforces the inner lower portion 65 (particularly, the lower-side connection portion 65c) against the above-described collision load.

The lower-side reinforcement portion 73 is provided to overlap with the upper-side side-sill flange 13 and the side-sill side wall portion 12c of the side sill 10 in the vehicle side view (i.e., when viewed from the vehicle width direction). Further, the lower-side reinforcement portion 73 is provided over a nearly entire part of the inner lower portion 65 (except a portion near its rear end), including a portion of the peripheral portion of the door inner panel 61 which corresponds to the first floor cross member 17 (a central portion, in the longitudinal direction, of the inner lower portion 65). That is, the lower-side reinforcement portion 73 is provided at the peripheral portion of the door inner panel 61 so as to overlap with the first floor cross member 17 in the vehicle side view (i.e., when viewed from the vehicle width direction).

The upper-side reinforcement portion 74 is a patch member which is attached along a left-side face of the upper-side connection wall portion 67c of the window frame portion 67 as shown in FIG. 7, and this reinforcement portion 74 reinforces the window frame portion 67 (particularly, the upper-side outer wall portion 67a and the upper-side connection wall portion 67c) against the collision load. The upper-side reinforcement portion 74 is provided to overlap with the roof-side flange 34 of the roof-side outer panel 33 in the vehicle side view (i.e., when viewed from the vehicle width direction). Further, the upper-side reinforcement portion 74 is provided at a portion of the peripheral portion of the door inner panel 61 which includes a portion corresponding to the roof cross member 36. That is, the upper-side reinforcement portion 74 is provided at the peripheral portion of the door inner panel 61 such that at least a part of the upper-side reinforcement portion 74 is located substantially at the same position, in the longitudinal direction, as the roof cross member 36.

The door outer panel 62 is made by processing a sheet of steel plate similarly to the door inner panel 61. The door outer panel 62 determines an outer shape (contour) of the front side door 5, when viewed from an outward side, in the vehicle width direction, of the vehicle 1 as shown in FIG. 1.

Herein, the rear side door 6 also comprises, similarly to the front side door 5, a door panel portion which is configured to close the rear-side opening portion 4 and such that its peripheral part overlaps with the vehicle-body frame member 2 (the side sill 10, the roof side rail 31, the center pillar 40, the wheel arch 50, and the quarter pillar 51) in the vehicle side view and plural reinforcement portions which are provided at a peripheral part of the door panel portion (at a peripheral part of its door inner panel, for example) so as to reinforce this peripheral part against a collision load inputted (applied) to the rear side door 6 from the vehicle outward side. These reinforcement portions are provided at respective portions of the peripheral part of the door panel portion of the rear side door 6 which overlap with the center pillar 40, the wheel arch 50, the side sill 10, and the roof side rail 31 in the vehicle side view (i.e., when viewed from the vehicle width direction).

The reinforcement portion provided at the portion of the peripheral part of the door panel portion of the rear side door 6 so as to overlap with the side sill 10 in the vehicle side view is provided to overlap with a third floor cross member which extends in the vehicle width direction in back of the second floor cross member 47 in the vehicle side view.

The reinforcement portion provided at the portion of the peripheral part of the door panel portion of the rear side door 6 so as to overlap with the wheel arch 50 in the vehicle side view is provided to overlap with a cross member which extends in the vehicle width direction and interconnects right-and-left rear side frames in the vehicle side view.

The reinforcement portion provided at the portion of the peripheral part of the door panel portion of the rear side door 6 so as to overlap with the roof side rail 31 in the vehicle side view is provided such that at least a part of this reinforcement portion is located substantially at the same position, in the longitudinal direction, as a roof cross member which extends in the vehicle width direction in back of the roof cross member 36.

Herein, the vehicle-body structure of the vehicle 1 is required to suppress the center pillar 40 from coming into the cabin as much as possible in the vehicle side view. In the case where the first and second impact bars 81, 82 are provided like the present embodiment, the collision load of the vehicle side collision can be absorbed to a certain degree by these impact bars 81, 82. However, since the vehicle-body frame member 2 receives the load transmitted from the impact bars 81, 82 at a point, there is a concern that the efficiency of the collision-load transmission to the vehicle-body frame member 2 may be low.

If a door frame member (a member having a closed-cross section, for example) is arranged between the door inner panel 61 and the door outer panel 62 like a conventional side door, the transmission efficiency of the collision load may be improved. However, since the weight reduction of the vehicle 1 is recently required from viewpoints of the fuel efficiency and the like, it is preferable that no door frame member be arranged.

Herein, according to the present embodiment of the invention, buckling deformation of the door inner panel 61 is so suppressed in the vehicle side collision by providing the reinforcement portions 71-74 at the peripheral part of the door inner panel 61 (particularly, at the portion which includes a part corresponding to the vehicle-width-direction-extending vehicle-body frame member in the vehicle side view) as described above that the collision load can be efficiently transmitted to the vehicle-body frame member 2. Further, the collision load can be efficiently transmitted to the vehicle-width-direction-extending vehicle-body frame member.

Hereafter, a motion of the door panel portion 60 in the vehicle side collision will be described referring to an example of the vehicle side collision shown in FIGS. 10-14. Herein, FIGS. 10-14 show a case where a collision object A collides with the left-side part of the vehicle 1. Further, FIGS. 10-14 show the motion of the door panel portion 60 of the front side door 5, omitting illustration of a motion regarding the rear side door 6.

Figure 10:
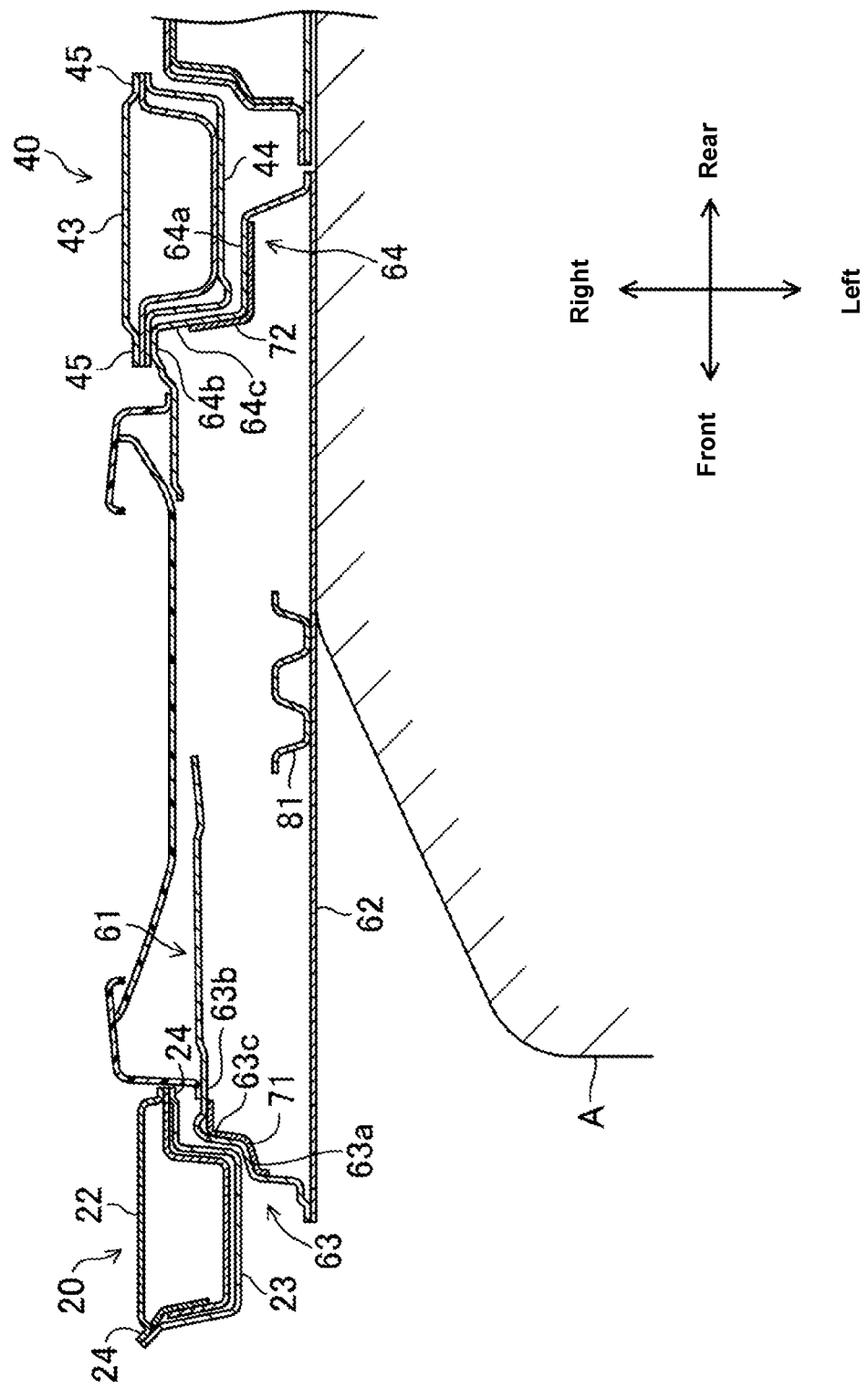
FIG. 10 is a sectional view of a central portion, in a vertical direction, of the front side door in an example of a vehicle side collision, which shows a state where a collision object contacts the front side door.

A situation where the collision object A (another vehicle, for example) moves toward the center pillar 40 and then contacts the left-side part of the vehicle 1 as shown in FIG. 10 is assumed here. Herein, the inner rear portion 64 is in a state where it is interposed between the center pillar 40 and the collision object A.

Figure 11:
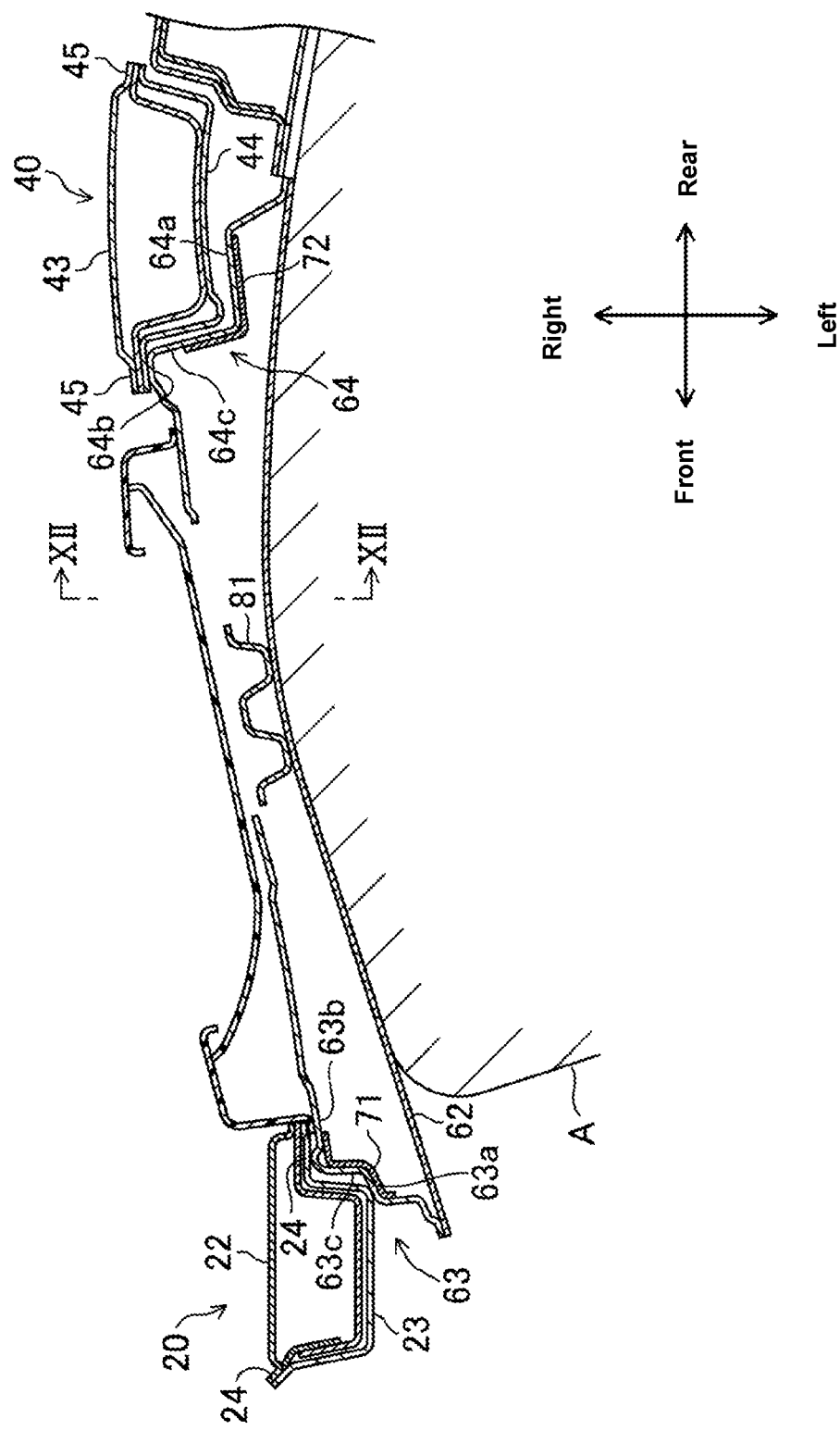
FIG. 11 is a sectional view showing a state where the collision object comes into a cabin from the state shown in FIG. 10, which corresponds to FIG. 10.

When the collision object A comes in as shown in FIG. 11 from the state shown in FIG. 10, a load directed to a cabin inside (to the right side in this figure) is inputted (applied). Herein, the front side door 5 is moved (pushed) to the right side and deformed such that its rear side is positioned at the right side. Accordingly, as shown in FIG. 11, the inner front portion 63 and the rear-side hinge-pillar flange 24 of the hinge pillar 20 come to contact each other, and the inner rear portion 64 and the front-side center-pillar flange 45 of the center pillar 40 come to contact each other. At this moment, the inner front portion 63 transmits the collision load to the hinge pillar 20 and also receives a reaction load from the hinge pillar 20. Further, the inner front portion 63 receives a force directed to the inside, in the surface direction, of the door inner panel 61 (to the rear side in this figure) through this coming-in of the collision object A. Meanwhile, the inner rear portion 64 transmits the collision load to the center pillar 40 and also receives a reaction load from the center pillar 40.

Figure 12:
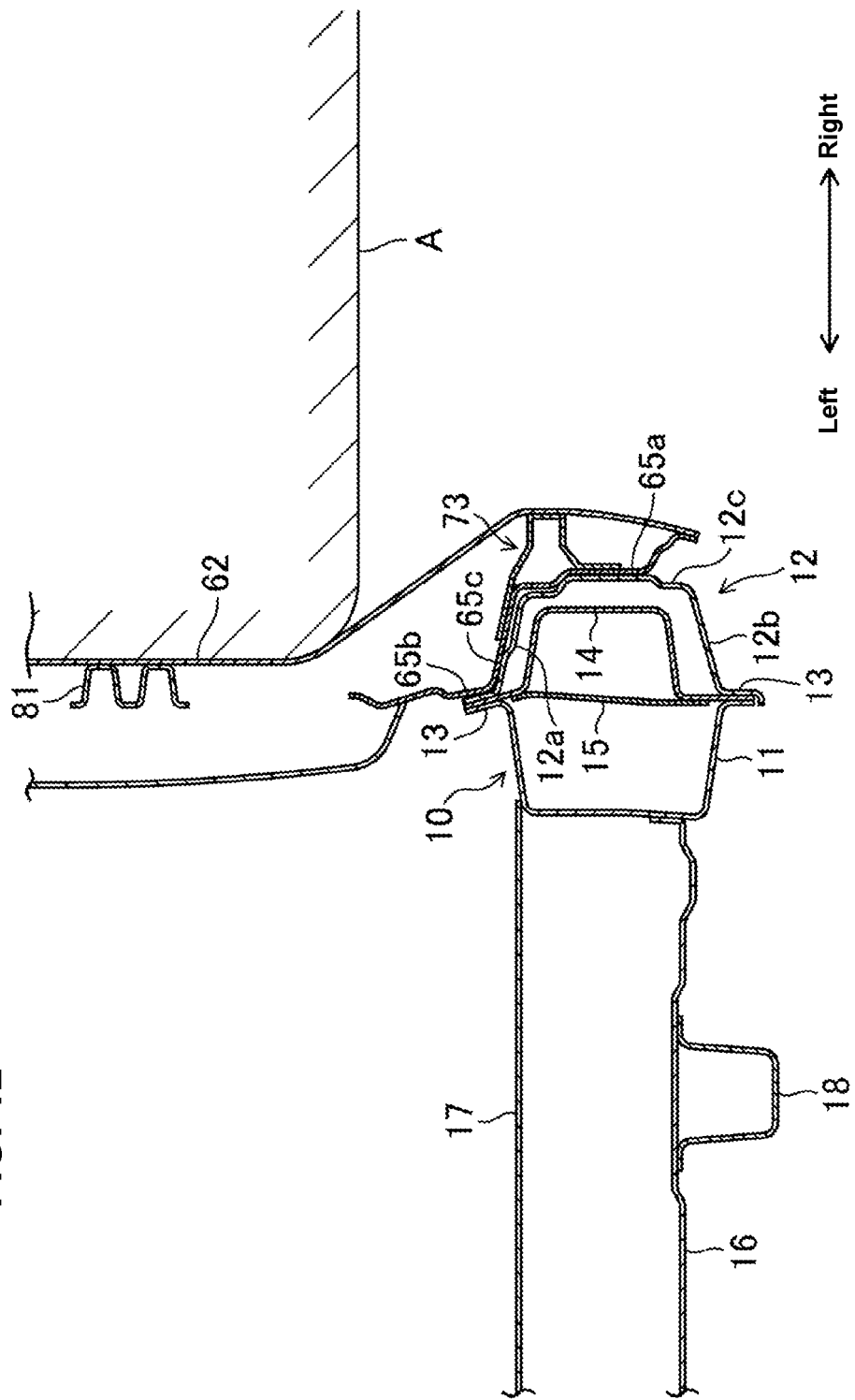
FIG. 12 is a sectional view taken along line XII-XII of FIG. 11.

Further, as shown in FIG. 12, the inner lower portion 65 comes to contact the upper-side side-sill flange 13 and the side-sill side wall portion 12*c* of the side sill 10. Accordingly, the inner lower portion 65 transmits the collision load to the side sill 10 and also receives a reaction force from the side sill 10. Further, the inner lower portion 65 receives the force directed to the inside, in the surface direction, of the door inner panel 61 (to the upper side in this figure) through the coming-in of the collision object A.

Also, the widow frame portion 67 comes to contact the roof side rail 31, which is not illustrated. Accordingly, the widow frame portion 67 transmits the collision load to the roof side rail 31 and also receives a reaction force from the roof side rail 31. Further, the roof side rail 31 receives the force directed to the inside, in the surface direction, of the door inner panel 61 (to the lower side in this figure) through the coming-in of the collision object A.

Figure 13:
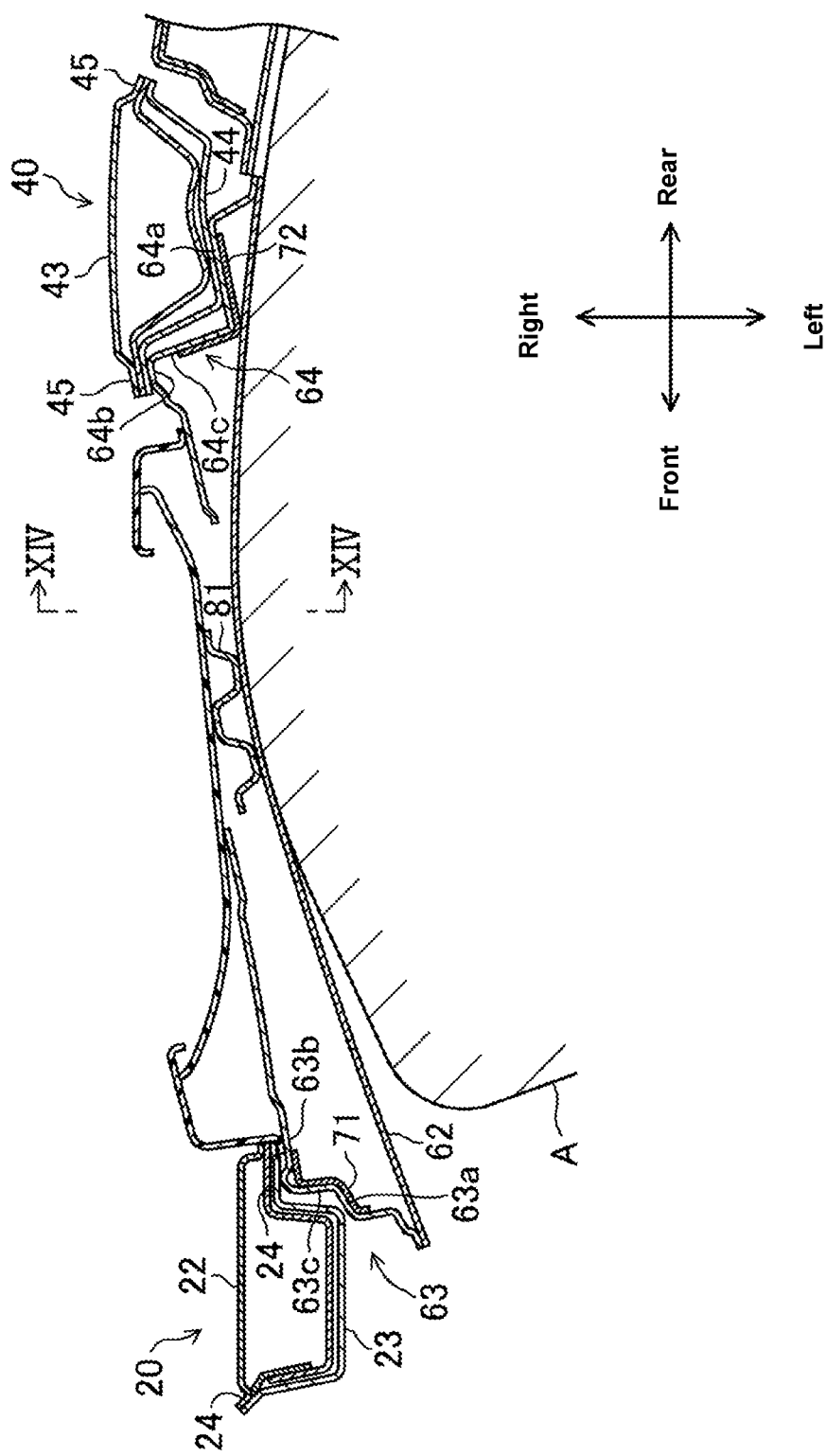
FIG. 13 is a sectional view showing a state where the collision object further comes into the cabin from the state shown in FIG. 11, which corresponds to FIG. 10.

A situation where the collision object A further comes to the right side from the state of FIG. 11 as shown in FIG. 13 is assumed here. The inner front portion 63 is suppressed from being deformed by the front-side reinforcement portion 71. Particularly, the front-side reinforcement portion 71 suppresses the front-side outer wall portion 63*a* from being rotated (rotational deformation) to the inside, in the surface direction, of the door inner panel 61 with a support point of the ridgeline between the front-side outer wall portion 63*a* and the front-side connection wall portion 63*c* and also suppresses the front-side connection wall portion 63*c* from being bent (bucking deformation) to the inside, in the surface direction, of the door inner panel 61. Thereby, the inner front portion 63 maintains its contact state (or its connection state) with the hinge pillar 20, without coming into the cabin at a position right behind the hinge pillar 20. Meanwhile, in this example of the vehicle side collision, since the inner rear portion 64 is interposed between the collision object A and the center pillar 40 in this collision situation, a contact state (or a connection state) of the inner rear portion 64 and the center pillar 40 is maintained. Thus, the transmission of the collision load from the inner front portion 63 to the hinge pillar 20 can be maintained and also the transmission of the collision load from the inner rear portion 64 to the center pillar 40 can be maintained.

As described above, since the front-side reinforcement portion 71 overlaps with the instrument-panel member 26 in the vehicle side view (i.e., when viewed from the vehicle width direction), the collision load of the vehicle side collision is transmitted from the door inner panel 61 (the portion where the front-side reinforcement portion 71 is provided) to the instrument-panel member 26 by way of the hinge pillar 20. Since it is the vehicle-body frame member extending in the vehicle width direction, the instrument-panel member 26 can receive the collision load properly. Further, since the front-side lower portion of the rear-side reinforcement portion 72 is located substantially at the same position, in the vehicle longitudinal direction, as the second floor cross member 47 as described above, the collision load of the vehicle side collision is transmitted from the door inner panel 61 (the portion where the rear-side reinforcement portion 72 is provided) to the second floor cross member 47 by way of the center pillar 47 and the side sill 10. Herein, since it is the vehicle-width-direction-extending vehicle-body frame member extending in the vehicle width direction, the second floor cross member 47 can receive the collision load properly.

Figure 14:
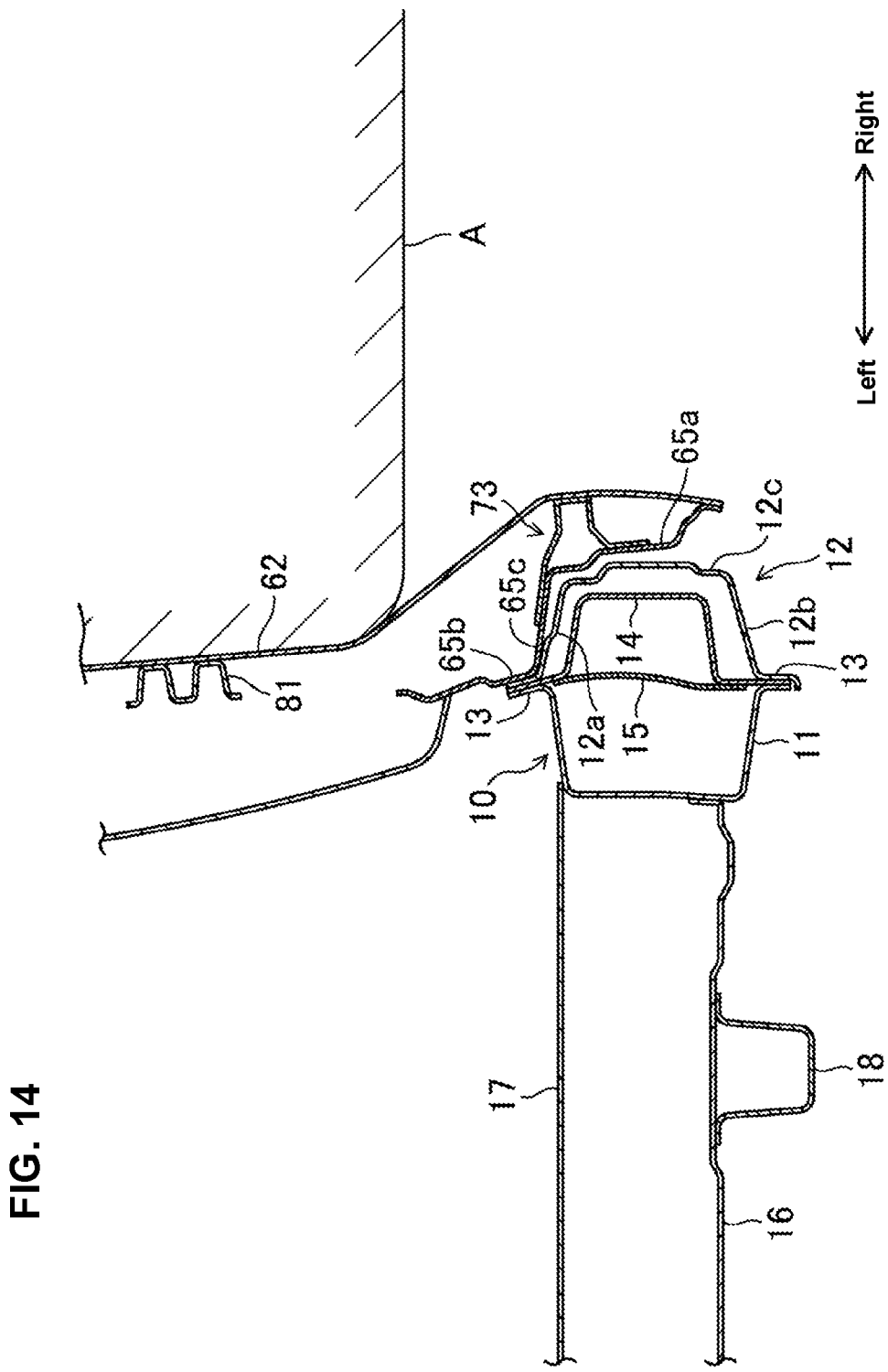
FIG. 14 is a sectional view taken along line XIV-XIV of FIG. 13.

Further, as shown in FIG. 14, it is suppressed by the lower-side reinforcement portion 73 that the inner lower portion 65 is deformed in such a manner that this inner lower portion 65 rides over the side sill 10. Particularly, the lower-side reinforcement portion 73 suppresses the lower-side outer wall portion 63*a* from being rotated (rotational deformation) to the inside, in the surface direction, of the door inner panel 61 with a support point of the ridgeline between the lower-side outer wall portion 63*a* and the lower-side connection wall portion 65*c* and also suppresses the lower-side connection wall portion 65*c* from being bent (buckling deformation) to the inside, in the surface direction, of the door inner panel 61. Thereby, the inner lower portion 65 maintains its contact state (or its connection state) with the side sill 10, without coming into the cabin at a position right above the side sill 10. Consequently, the transmission of the collision load from the inner lower portion 65 to the side sill 10 can be maintained.

As described above, since the lower-side reinforcement portion 73 overlaps with the first floor cross member 17 in the vehicle side view (i.e., when viewed from the vehicle width direction), the collision load of the vehicle side collision is transmitted from the door inner panel 61 (the portion where the lower-side reinforcement portion 73 is provided) to the first floor cross member 17 by way of the side sill 10. Since it is the vehicle-width-direction-extending vehicle-body frame member extending in the vehicle width direction, the first floor cross member 17 can receive the collision load properly.

Further, the upper-side outer wall portion 67a and the upper-side connection wall portion 67c of the window frame portion 67 are suppressed from having buckling deformation by the upper-side reinforcement portion 74, which is not illustrated. Thereby, the contact state (or the connection state) of the window frame portion 67 and the roof side rail 31 is maintained, without coming into the cabin at a position right below the roof side rail 31. Consequently, the transmission of the collision load from the window frame portion 67 to the rood side rail 31 can be maintained.

Since at least part of the upper-side reinforcement portion 74 is located substantially at the same position, in the vehicle longitudinal direction, as the roof cross member 36 at the peripheral portion (upper portion) of the door inner panel 61 as described above, the collision load of the vehicle side collision is transmitted from the door inner panel 61 (the portion where the upper-side reinforcement portion 74 is provided) to the roof cross member 36 by way of the roof side rail 31. Since it is the vehicle-width-direction-extending vehicle-body frame member extending in the vehicle width direction, the roof cross member 36 can receive the collision load properly.

As described above, the collision load of the vehicle side collision is transmitted from the front side door 5 to the vehicle-body frame member 2, being dispersed to the peripheral part of the door panel portion 60, by maintaining the contact state of the peripheral part of the door panel portion 60 of the front side door 5 and the vehicle-body frame member 2 in the vehicle side collision. Further, the collision load of the vehicle side collision is properly transmitted to the vehicle-width-direction-extending vehicle-body frame member (the instrument-panel member 26, the first floor cross member 17, the second floor cross member 47, and the roof cross member 36). This situation also happens to the rear side door 6 similarly. Thus, the amount of absorption of the collision load of the vehicle side collision can be increased.

Meanwhile, it is unnecessary that the plate thickness of the first impact bar 81 and the second impact bar 82 is made thick or these bars are made of a frame member having a closed-cross section in order to increase the amount of absorption of the collision load in the vehicle side collision. It is also unnecessary that the number of impact bar is increased or a new impact bar is added. Consequently, the weight reduction of the front side door 5 can be attained. The weight reduction of the rear side door 6 can be attained as well.

Accordingly, the weight reduction of the vehicle 1 and increasing of the amount of absorption of the collision load in the vehicle side collision can be compatibly attained.

The present invention should not be limited to the above-described embodiment and any other modifications or improvements may be applied within the scope of a spirit of the present invention.

For example, while the reinforcement portions 71-74 are provided at the door inner panel 61 in the above-described embodiment, these portions may be provided at a portion of a peripheral portion of the door outer panel 62 as the door panel portion 60 which includes a part corresponding to the vehicle-width-direction-extending vehicle-body frame member. Even in a case where the reinforcement portions 71-74 are provided at the door outer panel 62, it is suppressed that the side door is pushed into the cabin in the vehicle side collision, so that a contact state of the door outer panel 62 and the vehicle-body frame member 2 is maintained like the above-described embodiment.

Further, while the case where the contact state of the door inner panel 61 and the vehicle-body frame member 2 is maintained in the vehicle side collision is described in the above-described embodiment, an engagement state of the door panel portion 60 and the vehicle-body frame member 2 may be maintained by providing catcher pins as the reinforcement portions 71-74.

Moreover, while the door inner panel 61 (the inner lower portion 65) forms the closed-cross section together with only the lower-side reinforcement portion 73 in the above-described embodiment, the front-side reinforcement portion 71, the rear-side reinforcement portion 72, or the upper-side reinforcement portion 74 may form a closed-cross section together with the door inner panel 61. On the contrary, the lower-side reinforcement portion 73 may be a patch member attached along the wall portions of the door inner panel 61, similarly to the front-side reinforcement portion 71 and so on.

Also, a part or a whole part of the reinforcement portions 71-74 may not be configured to be a separate member from the door inner panel 61. In this case, the reinforcement portions 71-74 can be configured by making the plate thickness of a portion of the door inner panel 61 which corresponds to the reinforcement portions 71-74 thicker than the other part of the door inner panel 61, for example.

Further, while the reinforcement portions are the front-side reinforcement portion 71, the rear-side reinforcement portion 72, the lower-side reinforcement portion 73, and the upper-side reinforcement portion 74 in the above-described embodiment, the front-side reinforcement portion 71 and the upper-side reinforcement portion 74 may be omitted as long as the rear-side reinforcement portion 72 and the lower-side reinforcement portion 73 are provided at the portions of the peripheral part of the door panel portion which include the parts corresponding to the vehicle-width-direction-extending vehicle-body frame member (the second floor cross member 47 and the first floor cross member 17). In this case, it is preferable that the rear-side reinforcement portion 72 be configured to extend in the vertical direction as long as possible and the lower-side reinforcement portion 73 be configured to extend in the longitudinal direction as long as possible. Alternatively, the front-side reinforcement portion 71 and the lower-side reinforcement portion 74 may be provided only as the reinforcement portion and these portions 71, 73 may be provided at the portions of the peripheral part of the door panel portion which include the parts corresponding to the vehicle-width-direction-extending vehicle-body frame member (the instrument-panel member 26 and the first floor cross member 17). Further, the front-side reinforcement portion 71, the rear-side reinforcement portion 72, and the lower-side reinforcement portion 73 may be provided only as the reinforcement portion and these portions 71, 72, 73 may be provided at the portions of the peripheral part of the door panel portion which include the parts corresponding to the vehicle-width-direction-extending vehicle-body frame member (the instrument-panel member 26, the second floor cross member 47, and the first floor cross member 17).

Moreover, it is possible that at least two reinforcement portions among the front-side reinforcement portion 71, the rear-side reinforcement portion 72, the lower-side reinforcement portion 73, and the upper-side reinforcement portion 74 are formed integrally. For example, the front-side reinforcement portion 71 and the lower-side reinforcement portion 73, the rear-side reinforcement portion 72 and the lower-side reinforcement portion 73, or the front-side reinforcement portion 71, the rear-side reinforcement portion 72 and the lower-side reinforcement portion 73 may be respectively formed integrally. These integrated reinforcement portions can be regarded as a single reinforcement portion.

What is claimed is:

1. A vehicle-body structure of a vehicle, comprising:
an opening-portion-forming vehicle-body frame member forming an opening portion for entrance at a vehicle side part;
a side door provided so as to open and close the opening portion; and
a vehicle-width-direction-extending vehicle-body frame member extending in a vehicle width direction from a portion, in a peripheral direction of the opening portion, of said opening-portion-forming vehicle-body frame member,
wherein said side door comprises a door panel portion and a reinforcement portion, the door panel portion being provided to cover said opening portion and configured such that a peripheral part thereof overlaps with said opening-portion-forming vehicle-body frame member in a vehicle side view, the reinforcement portion being provided at the peripheral part of said door panel portion such that the reinforcement portion overlaps with said opening-portion-forming vehicle-body frame member in the vehicle side view, thereby reinforcing the peripheral part of the door panel portion against a collision load applied to the side door from a vehicle side,
wherein said reinforcement portion is provided at a portion of the peripheral part of the door panel portion which includes a part corresponding to said vehicle-width-direction-extending vehicle-body frame member;
wherein the vehicle-body structure of the vehicle further comprises:
  a front-side reinforcement portion, disposed along an inner front portion of the door panel portion which extends in a substantially vertical direction along a hinge pillar of the opening-portion-forming vehicle-body frame member,
  a rear-side reinforcement portion, disposed along an inner rear portion of the door panel portion which extends in a substantially vertical direction along a lower part of a center pillar of the opening-portion-forming vehicle-body frame member,
  a lower-side reinforcement portion, disposed along an inner lower portion of the door panel portion which extends along a side sill of the opening-portion-forming vehicle-body frame member and connects a lower-side end portion of the inner front portion and a lower-side end portion of the inner rear portion, and
  an upper-side reinforcement portion, disposed at a window frame portion of the door panel portion which forms a window opening portion and extends along a roof-side outer panel of the opening-portion-forming vehicle-body frame member;
wherein the front-side reinforcement portion overlaps with a rear-side hinge-pillar flange and a hinge-pillar side wall portion of the hinge pillar in the vehicle side view,
wherein the rear-side reinforcement portion overlaps with a front-side center-pillar flange and a center-pillar-side wall portion of the center pillar in the vehicle side view,
wherein the lower-side reinforcement portion overlaps with an upper-side side-sill flange and a side-sill side wall portion of the side sill in the vehicle side view, and
wherein the upper-side reinforcement portion overlaps with a roof-side flange of the roof-side outer panel in the vehicle side view.

2. The vehicle-body structure of the vehicle of claim 1, wherein said reinforcement portion is provided to overlap with the side sill in the vehicle side view and is provided at said peripheral part of the door panel portion such that the reinforcement portion overlaps with a floor cross member which constitutes said vehicle-width-direction-extending vehicle-body frame member in the vehicle side view.

3. The vehicle-body structure of the vehicle of claim 1, wherein said reinforcement portion is provided to overlap with the hinge pillar in the vehicle side view and is provided at said peripheral part of the door panel portion such that the reinforcement portion overlaps with an instrument-panel member which constitutes said vehicle-width-direction-extending vehicle-body frame member in the vehicle side view.

4. The vehicle-body structure of the vehicle of claim 1, wherein said reinforcement portion is provided to overlap with a roof side rail which constitutes said opening-portion-forming vehicle-body frame member in the vehicle side view and is provided at said peripheral part of the door panel portion such that at least a part of the reinforcement portion is located substantially at the same position, in a vehicle longitudinal direction, as a roof cross member which constitutes said vehicle-width-direction-extending vehicle-body frame member.

5. The vehicle-body structure of the vehicle of claim 2, wherein said reinforcement portion is provided to overlap with the hinge pillar in the vehicle side view and is provided at said peripheral part of the door panel portion such that the reinforcement portion overlaps with an instrument-panel member which constitutes said vehicle-width-direction-extending vehicle-body frame member in the vehicle side view.

6. The vehicle-body structure of the vehicle of claim 2, wherein said reinforcement portion is provided to overlap with a roof side rail which constitutes said opening-portion-forming vehicle-body frame member in the vehicle side view and is provided at said peripheral part of the door panel portion such that at least a part of the reinforcement portion is located substantially at the same position, in a vehicle longitudinal direction, as a roof cross member which constitutes said vehicle-width-direction-extending vehicle-body frame member.

7. The vehicle-body structure of the vehicle of claim 5, wherein said reinforcement portion is provided to overlap with a roof side rail which constitutes said opening-portion-forming vehicle-body frame member in the vehicle side view and is provided at said peripheral part of the door panel portion such that at least a part of the reinforcement portion is located substantially at the same position, in a vehicle longitudinal direction, as a roof cross member which constitutes said vehicle-width-direction-extending vehicle-body frame member.

* * * * *